United States Patent
Zhou

(10) Patent No.: US 12,039,569 B2
(45) Date of Patent: Jul. 16, 2024

(54) INFORMATION PROCESSING METHOD AND DEVICE, DISPLAY TERMINAL, AND STORAGE MEDIUM

(71) Applicant: TENCENT TECHNOLOGY (SHENZHEN) COMPANY LIMITED, Guangdong (CN)

(72) Inventor: Bin Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 202 days.

(21) Appl. No.: 16/307,040

(22) PCT Filed: Aug. 22, 2017

(86) PCT No.: PCT/CN2017/098543
§ 371 (c)(1),
(2) Date: Dec. 4, 2018

(87) PCT Pub. No.: WO2018/036493
PCT Pub. Date: Mar. 1, 2018

(65) Prior Publication Data
US 2019/0220899 A1    Jul. 18, 2019

(30) Foreign Application Priority Data

Aug. 25, 2016  (CN) .......................... 201610729635.4
Aug. 25, 2016  (CN) ......................... 201610729754.X

(51) Int. Cl.
*G06Q 30/0251*    (2023.01)
*G06F 3/0484*    (2022.01)
(Continued)

(52) U.S. Cl.
CPC ....... *G06Q 30/0267* (2013.01); *G06F 3/0484* (2013.01); *G06F 3/0488* (2013.01); *G06Q 30/02* (2013.01)

(58) Field of Classification Search
CPC ... G06Q 30/02; G06Q 30/0267; G06F 3/0484
See application file for complete search history.

(56) References Cited

U.S. PATENT DOCUMENTS 9,501,171 B1 * 11/2016 Newcomb ............. G06F 3/0485
10,275,804 B1 *  4/2019 Cselle ................. G06Q 30/0277
(Continued)

FOREIGN PATENT DOCUMENTS

CN    101520878 A    9/2009
CN    103327110 A    9/2013
(Continued)

OTHER PUBLICATIONS

Frank et al., "Touchalytics: On the Applicability of Touchscreen Input as a Behavioral Biometric for Continuous Authentication," IEEE Transactions on Information Forensics and Security, vol. 8, No. 1, pp. 136-148 (Year: 2013).*

(Continued)

*Primary Examiner* — Resha Desai
*Assistant Examiner* — Patrick Kim
(74) *Attorney, Agent, or Firm* — Sughrue Mion, PLLC

(57) ABSTRACT

An information processing method and apparatus, a display terminal, and a storage medium are provided. The method includes presenting service information in a graphical interface of an application client running on a terminal. The method further includes listening to an operation event that is a record of operation of the terminal by a user for the service information. The method further includes determining based on the operation event obtained by listening, that an operation performed by the user on the service informa- (Continued)

tion corresponds to an operation scene. The method further includes presenting in the graphical interface of the terminal, promotion information by using a presentation parameter matching the operation scene.

19 Claims, 21 Drawing Sheets

(51) Int. Cl.
  *G06F 3/0488* (2022.01)
  *G06Q 30/02* (2023.01)

(56) References Cited

U.S. PATENT DOCUMENTS

| | | | |
|---|---|---|---|
| 2011/0264491 A1 | 10/2011 | Birnbaum et al. | |
| 2014/0354602 A1* | 12/2014 | He | G06F 3/017 345/175 |
| 2014/0358826 A1* | 12/2014 | Traupman | G06N 5/02 706/46 |
| 2015/0341457 A1 | 11/2015 | Huang et al. | |
| 2016/0019604 A1 | 1/2016 | Kobayashi et al. | |
| 2016/0027060 A1 | 1/2016 | Kobayashi et al. | |
| 2016/0086219 A1* | 3/2016 | Richardson | G06F 3/0485 707/728 |
| 2017/0115842 A1* | 4/2017 | Yin | G06F 3/04886 |
| 2017/0126825 A1* | 5/2017 | Yu | G06F 3/013 |
| 2017/0140285 A1* | 5/2017 | Dotan-Cohen | G06F 9/453 |
| 2017/0185912 A1* | 6/2017 | Friggeri | H04L 67/02 |
| 2018/0285472 A1* | 10/2018 | Krutzler | G06F 3/04883 |

FOREIGN PATENT DOCUMENTS

| | | |
|---|---|---|
| CN | 104361085 A | 2/2015 |
| CN | 104935981 A | 9/2015 |
| CN | 105468348 A | 4/2016 |
| CN | 105677357 A | 6/2016 |
| WO | 2007052205 A1 | 5/2007 |

OTHER PUBLICATIONS

Communication dated Sep. 2, 2019 from the State Intellectual Property Office of the P.R.C. in application No. 201610729635.4.
Written Opinion, dated Nov. 29, 2017 from the International Bureau in counterpart International application No. PCT/CN2017/098543.
International Search Report for PCT/CN2017/098543 dated Nov. 29, 2017 (PCT/ISA/210).
Communication dated Mar. 5, 2021, from the European Patent Office in application No. 17842915.5.

* cited by examiner

INFORMATION PROCESSING METHOD AND DEVICE, DISPLAY TERMINAL, AND STORAGE MEDIUM

CROSS-REFERENCE TO RELATED APPLICATION

This application is a National Stage entry of International Patent Application No. PCT/CN2017/098543, filed on Aug. 22, 2017, which claims priority from Chinese Patent Application No. 201610729754.X and Chinese Patent Application No. 201610729635.4, both entitled "INFORMATION PROCESSING METHOD AND INFORMATION PROCESSING DEVICE" and filed in the Chinese Patent Office on Aug. 25, 2016, the disclosures of which are incorporated by reference herein in their entirety.

BACKGROUND

1. Field

The present disclosure relates to information promotion technologies in the communications field, and in particular, to an information processing method and apparatus, a display terminal, and a storage medium.

2. Description of Related Art

With the vigorous development of the Internet industry and especially the mobile Internet, information promotion by using the Internet has become a new form for information transmission that is widely applied.

An Internet advertisement (an advertisement for short below), as a typical technology for information promotion in the Internet, has become an important means for a user to obtain information and for an advertiser to improve popularity and promote a product.

There are varied forms of advertisements, which typically include the following several types:

1) a web page advertisement: an advertisement that is pushed in a web page accessed by a user such that the advertisement pops up in the web page browsed by the user;
2) a video advertisement: an advertisement provided before a video is played and in a process of playing the video that pops up in a video playing interface; and
3) an advertisement in an application: an advertisement provided after a user installs various application clients in a terminal such as a smartphone or a tablet computer that pops up in a process in which the user uses the application client.

A problem that exists is that, in a related art technology, promotion information is often pushed to a user in a process of obtaining service information by the user; consequently, interference is inevitably caused to the process of obtaining the information by the user, and a process of normally obtaining the service information by the user is affected.

There is still no effective solution in a related technology to reduce interference caused by pushing of promotion information, and to ensure that the user may normally obtain information and ensure an effect of the promotion information may be achieved.

SUMMARY

It is an aspect to provide an information processing method and apparatus, a display terminal, and a storage medium that resolve a problem of promotion information causing great interference to a user and/or a problem of causing a presentation effect of the promotion information to be poor.

According to an aspect of one or more example embodiments, there is provided a method. The method includes presenting service information in a graphical interface of an application client running on a terminal. The method further includes listening to an operation event that is a record of operation of the terminal by a user for the service information. The method further includes determining based on the operation event obtained by listening, that an operation performed by the user on the service information corresponds to an operation scene. The method further includes presenting in the graphical interface of the terminal, promotion information by using a presentation parameter matching the operation scene.

According to other aspects of one or more example embodiments, there is also provided an apparatus and a computer-readable storage medium consistent with the method.

BRIEF DESCRIPTION OF THE DRAWINGS

Example embodiments will be described below with reference to the accompanying drawings, in which:

FIG. 5-1 is a schematic flowchart of an information processing method according to an example embodiment;

FIG. 5-2 is a schematic flowchart of an information processing method according to an embodiment;

FIG. 7-1 through FIG. 7-4 are schematic display diagrams of loading a promotion information position and presenting promotion information according to an example embodiment;

FIG. 9-1 through FIG. 9-3 are other schematic flowcharts of an information processing method according to an example embodiment;

FIG. 10-1 through FIG. 10-4 are schematic display diagrams of presenting promotion information according to an example embodiment;

FIG. 12-1 through FIG. 12-6 are schematic display diagrams of loading an advertisement position in a news stream and presenting a video advertisement according to an example embodiment;

DETAILED DESCRIPTION

Figure 1:
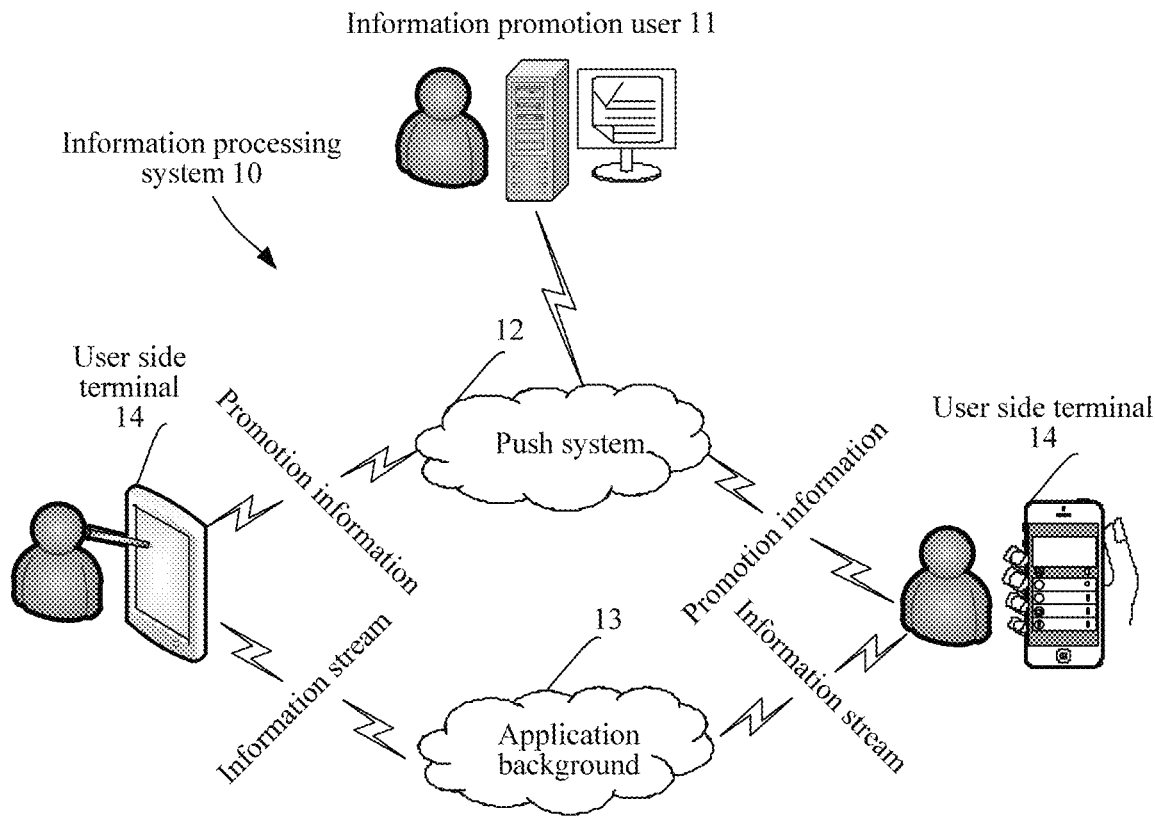
FIG. 1 is a schematic architectural diagram of an information processing system according to an example embodiment.

The present disclosure is further described in detail below with reference to the accompanying drawings and example embodiments. It should be understood that the example embodiments provided herein are merely used to explain the present disclosure but are not intended to limit the present disclosure. In addition, the example embodiments provided below are some example embodiments used to implement the present disclosure, and not all embodiments for implementing the present disclosure are provided. In the case of no conflicts, the example embodiments may be combined with each other.

Before the present disclosure is further described in detail. Nouns and terms used in the example embodiments are described. The nouns and terms used in the example embodiments are applicable to the following explanations.

1) An information stream is a series of information arranged in a particular manner, for example, a photo stream arranged according to a capture time, a news stream arranged according to an occurrence time, or a social friend status stream arranged according to an update time.

2) A target service is a service expected to be used in an application client installed by a user in a terminal, for example, a service of reading news and current affairs by using a news client or viewing a friend status by using a social client, where information carrying the target service is referred to as service information.

3) An information stream of a target service is an information stream related to a service of an application client (for example, a service run in a user side terminal) and obtained by the application client from an application background, for example, a photo stream obtained by an electronic albums client from a cloud, news obtained by a news client from a news background server, or a status (such as a status or a share in a form of a photo or a video) stream released by a social friend and obtained by a social client from a social application background.

4) A service information position is a display area that is in an application client and that is used to present service information, for example, a particular area in a graphical interface of the application client, and the service information position occupies some display areas of the application client.

A graphical interface of an application client may include multiple service information positions to present multiple pieces of service information in the graphical interface at a time, for example, an electronic albums client presents multiple photos in a photo stream in a graphical interface at a time, a news client presents full texts or abstracts of multiple pieces of news in a graphical interface at a time, or a social client presents multiple statuses of friends of a user in a graphical interface at a time.

5) An application client is an executable program to be run in a user side terminal and supports use of a corresponding service by a user, for example, a service of reading news and current affairs by using a news client or viewing a friend status by using a social client, where information carrying a target service is referred to as service information.

6) Promotion information is a general name of information that needs to be transmitted in an application client on a user side for a user having a promotion requirement (an information promotion user for short below), and is different from service information related to a service of the application client and obtained by the application client.

For example, service information of a social client is a status of a social friend, and multiple statuses form a friend status stream; and promotion information may be an advertisement that an advertiser expects to push to a user satisfying a directing condition or an important news announcement that a press unit expects to push to all users.

In another example, service information of a news client application is news, and multiple pieces of news form a news stream; and promotion information is different from news and may be an advertisement that an advertiser expects to push to a user satisfying a directing condition.

7) A promotion information position is an area that is in an application client and that is used to present promotion information, for example, a particular area in a graphical interface of the application client.

For example, a promotion information position may occupy all areas of an application client such that the promotion information position is presented in a full screen mode; or a promotion information position may occupy some areas of an application client for presentation such that the promotion information position is presented in a non-full-screen mode; in this case, a service information position and the promotion information position are both loaded in the application client.

8) An operation event is a record of a user operation. For example, when a user performs voice control on an operation object, a voice control event is generated that may include an object on which a voice operation is performed by the user and an operation manner. Also, for example, when the user controls an operation object by using a keyboard or a mouse, a keyboard event and a mouse event are correspondingly generated that may include an operation object and a triggered key.

9) A terminal is device running an application client on a user side, and may be, for example, a fixed terminal such as a desktop computer, a set-top box, an Xbox/PS3 game console, or an outdoor advertisement presentation screen or may be, for example, a mobile terminal such as a smartphone, a notebook computer, a tablet computer, or an in-vehicle advertisement presentation screen.

10) Exposure: one time of presentation of promotion information at a promotion information position in an application client in a user side terminal is referred to as one time of exposure.

11) A presentation parameter may include a parameter such as a display parameter, and may be a related control parameter or the like for outputting corresponding information, for example, a display position, display duration, a display manner or a display color feature. In the example embodiments of the present disclosure, a presentation parameter of promotion information may include a disposition position of a promotion information position, an information type or information subject content of the promotion information, or a presentation manner. Herein, the presentation manner may be a presentation manner of the promotion information position or may be a presentation manner of the promotion information. For example, the presentation manner of the promotion information may be sliding in from bottom to top in a display terminal for display, or sliding in from left to right for display. Certainly, herein, this is merely an example, and during specific implementation, the example embodiments are not limited thereto.

Referring to a schematic architectural diagram of an information processing system 10 according to an example embodiment shown in FIG. 1, FIG. 1 includes an information promotion user 11, a push system 12, an application background 13, and a user side terminal 14. A topology structure of the information processing system 10 is described below with reference to FIG. 1.

The push system 12 is configured to push promotion information (such as an advertisement) to the user side terminal 14 for the information promotion user 11.

For example, the push system 12 pushes, according to a directing condition that is set by the information promotion user 11 for the promotion information, the promotion information to a user side terminal that satisfies the directing condition. Generally, the information promotion user 11 sets, in the push system 12, a directing condition for pushing an advertisement, including: a region, an age, a level of education, and a terminal device type of the user, and certainly, may set a directing condition of another type such as an income level or a hobby type.

Particularly, the push system 12 pushes, according to an application client type (such as a news client or a social client) that is set by the information promotion user 11, promotion information to a terminal in which an application client of a corresponding type is run on a user side so that the promotion information is exposed at a promotion information position on the application client on the user side.

The application background 13 is configured to send an information stream of a target service to an application client in the user side terminal 14, for example, send a news stream to the news client, or send a friend status stream to the social client.

An example embodiment provides an information processing method. When promotion information is presented (which at least includes displaying), service information is first displayed in a graphical interface; then, an operation performed by a user on the service information is detected by listening to an operation event; an operation scene is determined based on an operation parameter (an operation type, an operation attribute, or the like) of the operation event; a presentation parameter for presenting the promotion information is determined based on the operation scene; and the promotion information is presented in the graphical interface based on the determined presentation parameter. Herein, the operation type may include a slide operation, a tap operation, a voice operation, or the like. The operation attribute may include various pieces of information that may be used to describe an operation such as a slide distance of a slide operation, a slide direction of a slide operation, or a quantity of touch points or a quantity of taps in a tap operation. In this way, the presentation parameter matching the operation scene is used to present the promotion information so that it is very natural and it is not very crude and abrupt, thereby reducing dislike from the user and reducing interference to the user. The promotion information includes at least display information, and therefore, the presenting the promotion information includes at least displaying the display information. The promotion information may further include audio information, and the presenting the promotion information may further include: outputting the audio information in the promotion information by using a device such as a speaker.

An example embodiment further provides an information processing apparatus for implementing and applying the foregoing information processing method. From the perspective of hardware, for example, the information processing apparatus may be implemented based on a resource of a user side terminal such as a computing resource (such as a processor) and a communications resource (such as a network interface). From the perspective of software, the information processing apparatus may be implemented as executable instructions (including computer executable instructions such as a program and a module) stored in a storage medium of the user side terminal.

Figure 3:
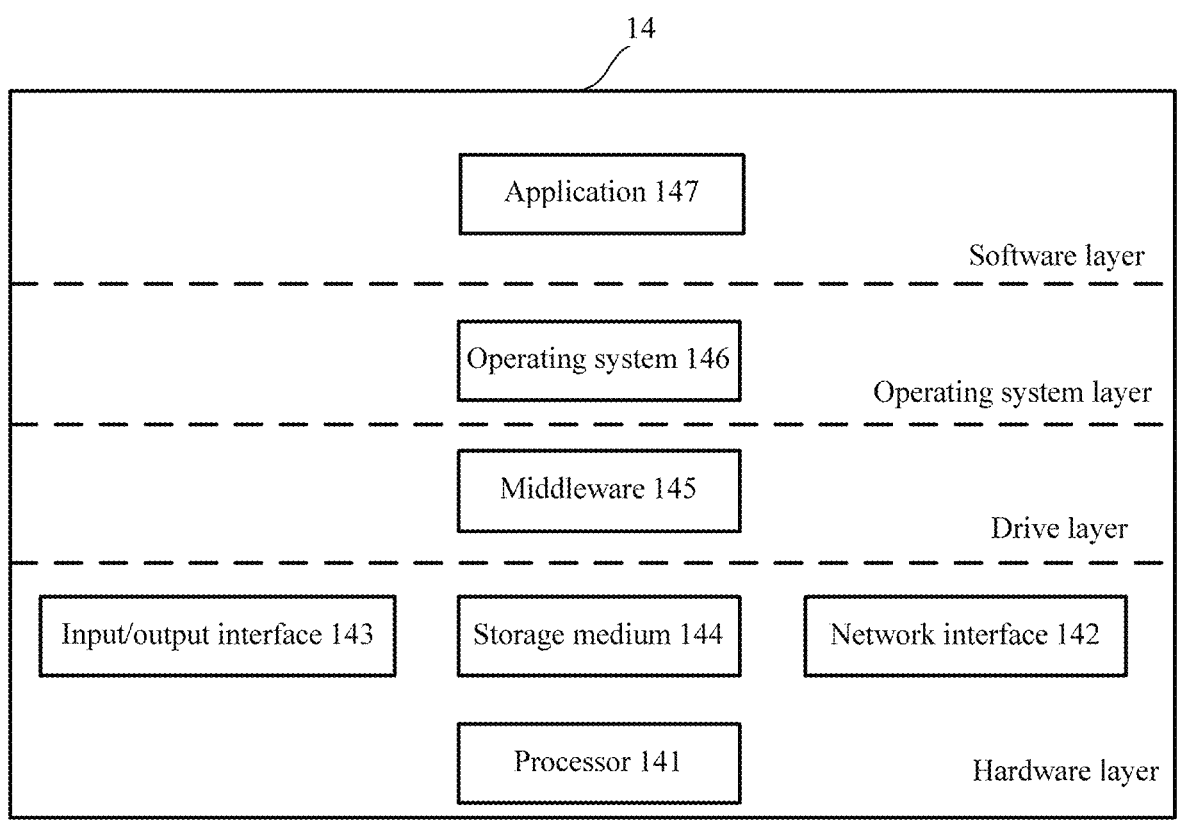
FIG. 3 is a schematic diagram of a software and hardware structure of a terminal according to an example embodiment.

As described above, when the information processing apparatus is implemented based on the resource of the user side terminal, referring to a schematic diagram of a software and hardware structure of the terminal 14 shown in FIG. 3, the terminal 14 includes a hardware layer, a drive layer, an operating system layer, and a software layer. However, a person skilled in the art should understand that the structure of the terminal 14 shown in FIG. 3 is merely an example and does not constitute a limitation to the structure of the terminal 14. For example, more components than those shown in FIG. 3 may be disposed in the terminal 14 according to an implementation requirement, and disposition of some components may be omitted according to an implementation requirement.

The hardware layer of the terminal 14 includes a processor 141, an input/output (I/O) interface 143, a storage medium 144, and a network interface 142, and the components may be connected and perform communication by using a system bus.

The processor 141 may be implemented by using a central processing unit (CPU), a microcontroller unit (MCU), an application-specific integrated circuit (ASIC), or a logic field programmable gate array (FPGA).

The I/O interface 143 may be implemented by using an I/O device such as a display screen, a touchscreen, or a speaker.

The storage medium 144 may be implemented by using a non-volatile storage medium such as a flash memory, a hard disk, or an optical disc, or may be implemented by using a volatile storage medium such as a double data rate (DDR) dynamic cache, in which executable instructions configured to perform the foregoing information processing method are stored.

For example, the storage medium 144 may be disposed at a same place as the terminal 14, or may be remotely disposed relative to the terminal 14, or may be locally and remotely disposed or distributed relative to the terminal 14. The network interface 142 provides, to the processor 141, external data such as an access capability of the remotely disposed storage medium 144. For example, the network interface 142 may perform short-distance communication based on a Near Field Communication (NFC) technology, a Bluetooth technology, or a ZigBee technology, and may further implement communication based on a communication standard such as Code Division Multiple Access (CDMA), or Wideband Code Division Multiple Access (WCDMA), or an evolving standard thereof.

The drive layer includes middleware 145 used by the operating system 146 to identify the hardware layer and communicate with various components on the hardware layer, and for example, may be a set of drivers for the components on the hardware layer.

The operating system 146 is configured to provide a user-oriented graphical interface that includes, for example, a plug icon, a desktop background, and an application icon for an application 147 running on the software layer. The operating system 146 supports control of the user on a device by using the graphical interface. A software environment of the device, such as a type and a version of the operating system, is not limited in this example embodiment, which, for example, may be an Android operating system, an iOS operating system, a Linux operating system, or a UNIX operating system.

Figure 2:
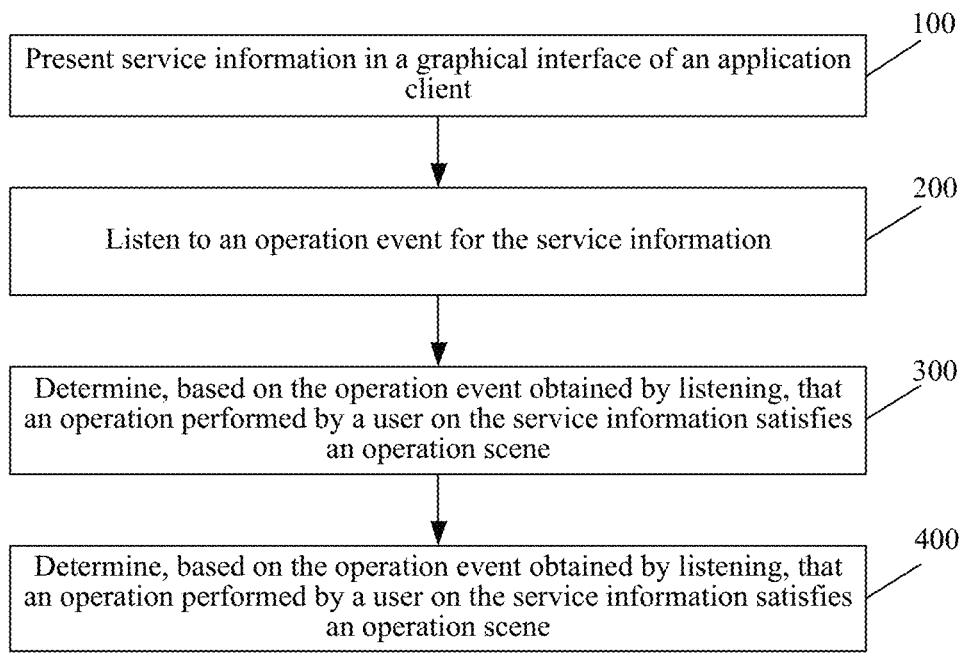
FIG. 2 is a schematic flowchart of an information processing method according to an example embodiment.

As shown in FIG. 2, an example embodiment provides an information processing method, including at least the following steps:

Step 100: Present service information in a graphical interface of an application client.

As described above, multiple types of application clients such as a social client and a news client may be run in a terminal. For example, each application client pulls an information stream of service information of a target service (such as any service supported by the application client or a service that a user needs to use) from a corresponding application background at an interval (periodically or aperiodically), or each application client receives an information stream actively delivered by a corresponding application background. After these service streams are received or pulled, at least some service information is presented in a graphical interface of the application client.

Step 200: Listen to an operation event for the service information.

The service information is presented in the graphical interface of the application client. In this way, the user may view corresponding service information. In this case, the user taps or slides the service information or the like. Such an operation performed by the user on the service information is at least one of operation events for the service information. For example, an operation event of the user for an operation type of the service information may be a touch operation event, a voice control event, a keyboard event, a mouse event, or the like; and operation events of various types are records of user operations. For example, an operation performed on service information in the application client on a user side causes an event that is reported by a corresponding I/O on a hardware layer of user equipment to a system layer, for example, when the user performs a touch operation on an operation object, a corresponding touch event is generated, including operation data such as a specific position and a time of the user operation and a type of the touch operation. Similarly, when the user performs a voice control operation on an operation object in the application client, a corresponding voice control event is generated, including an identifier of the operation object on which the user performs the voice operation, an operation manner, and the like.

Step 300: Determine, based on the operation event obtained by listening, that an operation performed by a user on the service information satisfies an operation scene. In an example embodiment, a machine learning method is used to train a model used to identify an operation scene, for example, a neural network model, and the neural network model is used to predict a satisfied operation scene based on an operation event obtained by listening. In another example embodiment, an operation scene corresponding to an operation event that is currently listened to may be determined by using a preset correspondence between an operation event and an operation scene.

Step 400: Present, in the graphical interface, promotion information by using a presentation parameter matching the operation scene. In an example embodiment, a machine learning method is used to train a model used to determine a presentation parameter, for example, a neural network model, and the neural network model is used to output a corresponding presentation parameter based on an operation scene as an input parameter. In another example embodiment, a presentation parameter corresponding to a current operation scene may be determined by using a preset correspondence between an operation scene and a presentation parameter.

Apparently, in this example embodiment, the promotion information is not randomly presented or always presented. First, the service information is presented. In this way, it is convenient for the user to first view the service information. From the perspective of an information display sequence, the service information is displayed in priority to meet a requirement for viewing the service information by the user and reduce information interference to viewing the service information by the user. Second, after the service information is presented, the user performs a particular operation on the service information, the operation scene is obtained based on the operation, and the presentation parameter corresponding to the operation scene is determined to present the promotion information, instead of forcedly presenting the promotion information by using a current forced manner such as a pop-up window, thereby reducing dislike from the user, improving use satisfaction of the user, and reducing sensory interference to the user.

In some example embodiments, step 400 may include:
determining, based on the operation scene, at least one of a promotion information position, an attribute of presented information, a presentation manner, and the like; and
presenting the promotion information position in the graphical interface, and presenting the promotion information at the promotion information position; and/or, presenting, in the graphical interface, the promotion information matching the information attribute; and/or, presenting the promotion information in the graphical interface in the presentation manner or displaying a promotion information position of the promotion information.

The promotion information position is a display position dedicated for displaying the promotion information. The information attribute may be a parameter for describing information content and/or an information form of corresponding promotion information. The information form may include image information, text information, and/or video information. The information content may be content of a subject and/or a keyword and/or an information label of the promotion information. The information label may be a label of an attribute related to at least the information content and set by a provider of the promotion information.

The presentation manner may include a display manner of the promotion information, for example, a progressive manner or a slide manner. If the promotion information includes audio information, the service information currently viewed by the user is text information and the user views a news manuscript in the news client quietly, and the inserted promotion information includes a sound and the promotion information is output with a relatively high output volume, the user may be freaked out. In this case, the progressive manner may be used to control to increase the output volume to output the audio information in the promotion information. The progressive manner may further include controlling to make display content in the promotion information gradually clear to prevent a case in which it is crude to directly switch from the service information to the promotion information, thereby improving stratification of the user with receiving the promotion information and reducing interference of the promotion information considered by the user. The slide manner may include sliding the display content in the promotion information in a display screen from the top of a display terminal, sliding the display content in a display screen from the bottom of a display terminal, sliding the display content in a display screen from the left of a display terminal, or sliding the display content in a display screen from the right of a display terminal, or another slide manner. Certainly, herein, this is merely an example, and during specific implementation, an example embodiment is not limited thereto.

Figure 4:
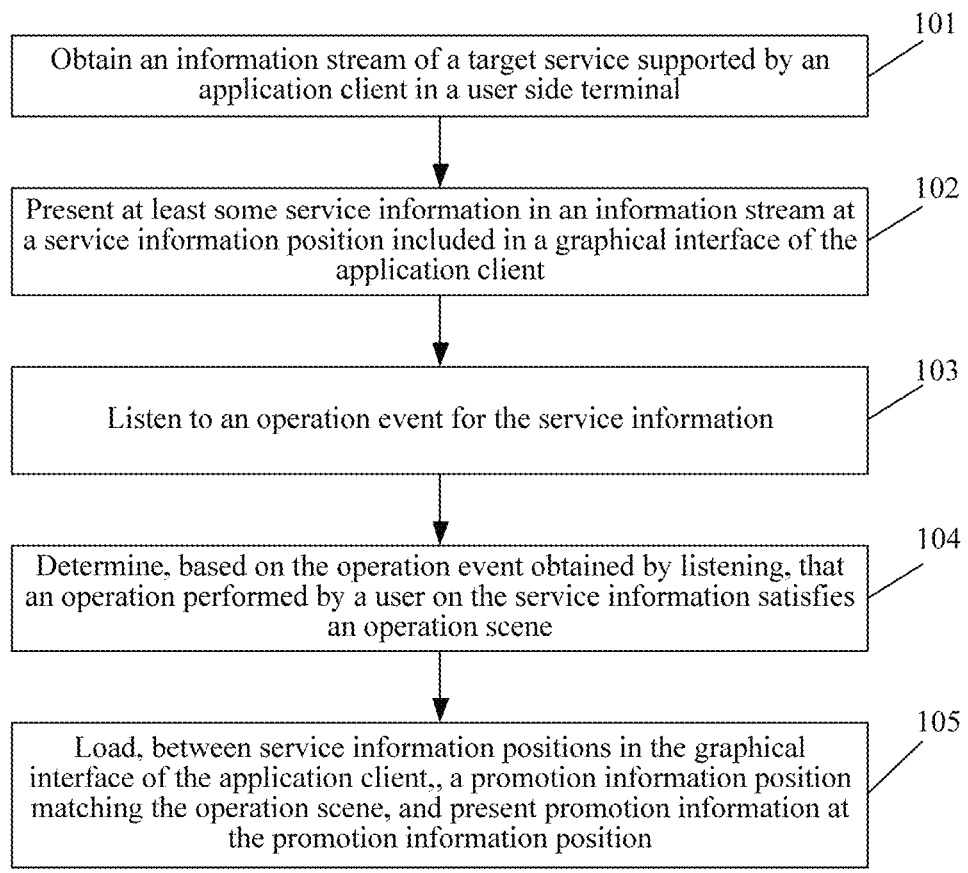
FIG. 4 is a schematic diagram of a software and hardware structure of a terminal according to an example embodiment.

To reduce interference caused to a user by promotion information pushed on a user side, referring to a schematic flowchart of an information processing method according to an example embodiment shown in FIG. 4, an information stream of a target service supported by an application client in a user side terminal is obtained (step 101); at least some service information in an information stream is presented at a service information position included in a graphical interface of the application client (step 102); an operation event for the service information is listened to (step 103); it is determined, based on the operation event obtained by listening, that an operation performed by a user on the service information satisfies an operation scene (step 104); and a promotion information position matching the operation scene is loaded between service information positions in the graphical interface of the application client, and promotion information is presented at the promotion information position (step 105).

Figures 1, 5:
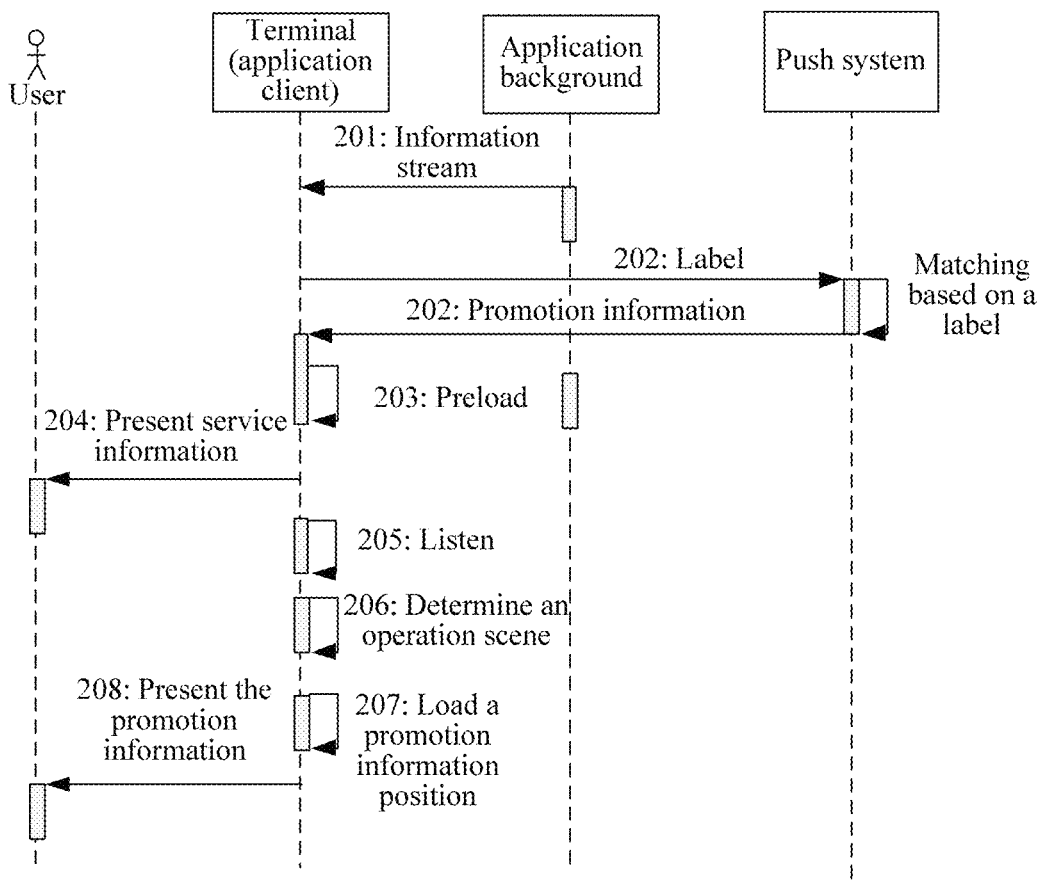
Figures 2, 5:
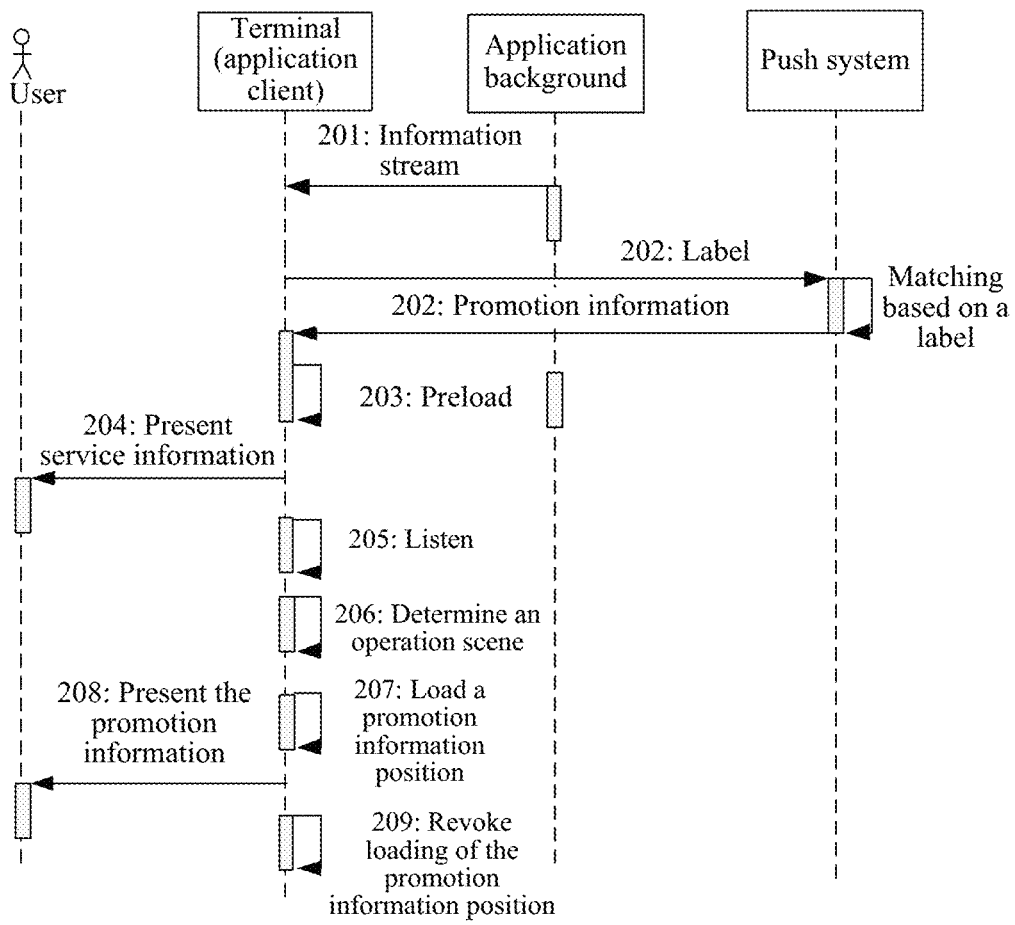

Referring to a schematic flowchart of an information processing method shown in FIG. 5-1, the method includes the following steps:

Step 201: An application client in a terminal obtains an information stream of a target service from an application background.

As described above, multiple types of application clients such as a social client and a news client may be run in the terminal.

For example, each application client pulls an information stream of service information of a target service (such as any service supported by the application client or a service that a user needs to use) from a corresponding application background at an interval (periodically or aperiodically), or each application client receives an information stream actively delivered by a corresponding application background.

Step 202: The application client in the terminal obtains, from a push system, promotion information matching a user label of a user.

For example, when the application client in the terminal is in a running state, the application client reports the user label of the user to the push system; and the push system determines, according to a directing condition that is set by each promotion information push user for promotion information that needs to be pushed, a label satisfying the directing condition, and delivers corresponding promotion information to the application client in the terminal.

Step 203: The application client in the terminal preloads the promotion information.

The application client preloads the promotion information in a cache of the application client, so that efficiency of presenting the promotion information at the required promotion information position subsequently may be improved.

In an example embodiment, promotion information obtained from the push system is preloaded in the cache of the application client according to an obtaining sequence, and is read according to a ranking of the promotion information in the cache in a subsequent step.

In another example embodiment, promotion information obtained from the push system is sorted according to a particular dimension. For example, the dimension includes:

1) a space-time dimension: performing sorting in descending order of relevance between promotion information and users in a space-time dimension, where using an example in which promotion information is news, relevance with a current time and position of a user is calculated according to a mark of the space-time dimension carried in the news, so that an effect that promotion information matching space and a time of the user is exposed in priority may be achieved; and 2) a preference dimension: performing sorting in descending order of matching degrees between promotion information and user preferences, where using advertisements as an example, sorting is performed according to similarities between products promoted in the advertisements and products preferred by users, so that an effect that an advertisement preferred by a user is exposed in priority may be achieved.

Step 204: The terminal presents at least some service information in an information stream at a service information position included in a graphical interface of the application client.

In an example embodiment, according to a quantity of service information positions in the application client, complete content of the service information in the information stream is presented at a corresponding service information position according to particular sorting, or an abstract of the service information in the information stream is presented at a corresponding service information position according to particular sorting.

For example, when in response to a user operation, the application client in the terminal is switched to a foreground running state (for example, for a mobile terminal, generally, the graphical interface of the application client is in a full screen state, and certainly, may also be in a non-full-screen state), according to a quantity of service information positions that may be loaded in the graphical interface of the application client at a time, a corresponding quantity of service information positions are loaded in the graphical interface of the application client, and for various pieces of service information, all content or an abstract of service information in an information stream is correspondingly presented according to particular sorting.

During actual application, all content or an abstract of service information is presented at a service information position is determined according to an actual available display area of the service information position. For service information, if all content of the service information cannot be completely presented, an abstract of the service information may be presented. For example, the abstract uses a form of a thumbnail of all the content or uses a form of a word abstract and an image thumbnail (when the service information includes an image).

Using the application client in the terminal as an example again, herein, it is assumed that only four service information positions may be loaded in the graphical interface in the application client at a time, so that according to particular sorting of service information obtained from the application background (for example, sorting according to the space-time dimension or sorting according to the preference dimension), four pieces of service information ranked top are sequentially read and correspondingly presented at service information positions.

Using the news client in the terminal as an example, when the news client is enabled by the user or switched to foreground running, the news client correspondingly presents, at service information positions 1 to 4 in a graphical interface, four pieces of news in preloaded news that are ranked top according to the space-time dimension. During actual application, a dimension used to sort news may be a default dimension or a preset dimension.

Step 205: The terminal listens to an operation event for the service information.

As described above, an operation event of the user for an operation type of the service information may be a touch operation event, a voice control event, a keyboard event, a mouse event, or the like; and operation events of various types are records of user operations.

For example, as shown in FIG. 2, an operation performed on service information in the application client on a user side causes an event that is reported by a corresponding I/O on a hardware layer of user equipment to a system layer, for example, when the user performs a touch operation on an operation object, a corresponding touch event is generated, including operation data such as a specific position and a time of the user operation and a type of the touch operation. Similarly, when the user performs a voice control operation on an operation object in the application client, a corresponding voice control event is generated, including an identifier of the operation object on which the user performs the voice operation, an operation manner, and the like.

Step 206: The terminal determines, based on the operation event obtained by listening, that an operation performed by a user on the service information satisfies an operation scene.

In an example embodiment, a machine learning method is used to train a model used to identify an operation scene, for example, a neural network model, and the neural network model is used to predict a satisfied operation scene based on an operation event obtained by listening.

For example, some known operation scenes and corresponding operation events are used as training samples, such as {operation event, operation sample} with marks (a corresponding operation scene and an operation event), of an operation identification model. The machine learning method is used to train the neural network model so that the trained neural network model has a capability of predicting an operation scene based on an operation event.

Figure 6:
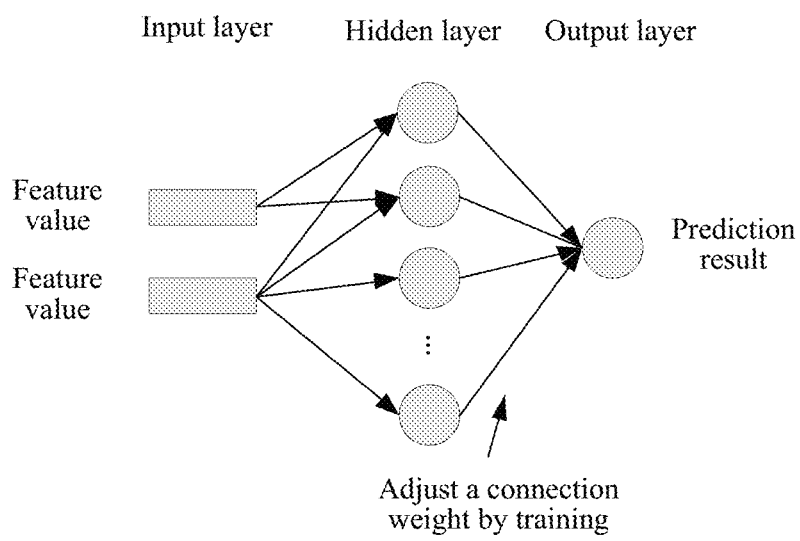
FIG. 6 is a schematic structural diagram of training a neural network model according to an example embodiment.

Using an example in which the neural network model is trained, a neural network model shown in FIG. 6 is created, and is used to predict an operation scene of the user based on an operation event obtained by listening. An input layer is responsible for receiving an input training sample and distributing the training sample to a hidden layer; the hidden layer is responsible for performing required calculation and outputting a result to an output layer; and the output layer outputs an operation scene in which the user performs an operation on service information.

A feature (such as a type of an operation object in a touch operation event or an operation manner) of a training sample input by the input layer of the neural network model is a derived variable; and a mapping relationship between the variable and an operation scene is learned on the hidden layer of the neural network model to achieve performance of outputting an operation scene predicted based on an operation event on the output layer of the neural network. After the neural network is completely trained, the operation event obtained by listening in step 206 is input to the neural network, to obtain a prediction result of the operation scene.

For example, the operation scene may include:
1) a browsing operation scene in which the service information is updated by using a slide operation, where
    for example, if continual operations of sliding upward are performed in the graphical interface of the news client to view other news in a news stream, the operation scene identification model is operated to identify that the user is in the browsing operation scene;
2) a focusing operation scene in which the service information is focused on by using a touch operation, where using a touch operation as an example, in a screen-on state, a finger of the user presses a piece of service information for a long time (exceeding a specified focusing time threshold such as 5 seconds), the operation scene identification model is operated to identify that the user performs a focusing operation on the service information.

It should be noted that, during actual application, the operation scene is not limited to the foregoing examples, and for example, further includes a sharing operation scene (for example, sharing with a social group), a forwarding operation scene in which service information is forwarded, and a comment operation scene in which a comment is made on service information. In addition, during actual application, operation scenes are diversified, and the operation scene may be a composite operation scene formed by combining the foregoing operation scenes, for example, a forwarding and comment operation scene in which service information is forwarded and a comment is made on the service information.

In this example embodiment, the foregoing operation scenes are referred to as common operation scenes. In addition, the user operation may further satisfy such a switching operation scene, that is, the user performs switching between the foregoing common operation scenes, for example, including switching between operation scenes in the following several forms:

1) A Browsing Operation Scene→a Focusing Operation Scene

Using an example in which the user uses the news client in the terminal, the news client presents abstracts of some news in a news stream at multiple service information positions, to form a news stream. When the user rapidly browses the abstracts of the news in the news stream (in this case, in an operation scene of a slide operation) and finds news that interests the user, the user taps the corresponding news to read specific content of the news ((in this case, in a focusing operation scene).

2) A Focusing Operation Scene→a Browsing Operation Scene

Still using the example in which the user uses the news client in the terminal, after the user reads a piece of news completely and returns to an interface of the news stream, the user continues to browse the abstracts of the news in the news stream to find content that interests the user.

3) A Browsing Operation Scene→a Focusing Operation Scene→a Sharing Operation Scene Using an example in which the user uses the social client in the terminal, the social client presents, at service information positions in the graphical interface, statuses shared by friends, to form a friend status stream. The user browses the statuses in the status stream, finds a status that interests the user, taps to read specific content, and forwards the status to another friend of the user during reading.

Step 207: The terminal loads, between service information positions in the graphical interface of the application client, a promotion information position matching the operation scene.

Step 208: The terminal presents the promotion information at the promotion information position.

In an example embodiment, a promotion information position matching the browsing operation scene is loaded, and when it is determined, by using the operation event obtained by listening, that it is in the slide operation scene, in response to a slide operation performed by the user on the service information, the promotion information position is loaded by sliding in the graphical interface at a first end of the graphical interface of the application client, and loading of the service information position is revoked by sliding out of the graphical interface at a second end of the graphical interface of the application client, until all areas of the promotion information position are loaded. The first end is one end to which a direction of the slide operation of the user in the graphical interface of the application client is opposite, and the second end is one end to which the direction of the slide operation of the user in the graphical interface of the application client points.

For example, when the user performs a slide operation from bottom to top in the graphical interface of the application client, according to an amplitude of sliding by the user, a promotion information position consistent with the amplitude is loaded at the bottom of the application client, to achieve an effect that the promotion information position "slides out" from the bottom of the graphical interface, and the promotion information position may use a full screen mode or a non-full-screen mode. After the promotion information position is completely loaded in the graphical interface of the application client, if the user continues to perform a slide operation from bottom to top, the application client continues to load a service information position after the promotion information position, to achieve an effect of loading a promotion information position between service information positions. The promotion information presented at the promotion information position is "integrated" with the service information loaded at the service information position, that is, an effect that the promotion information is presented in a content form consistent with the service information is achieved.

Figures 1, 7:
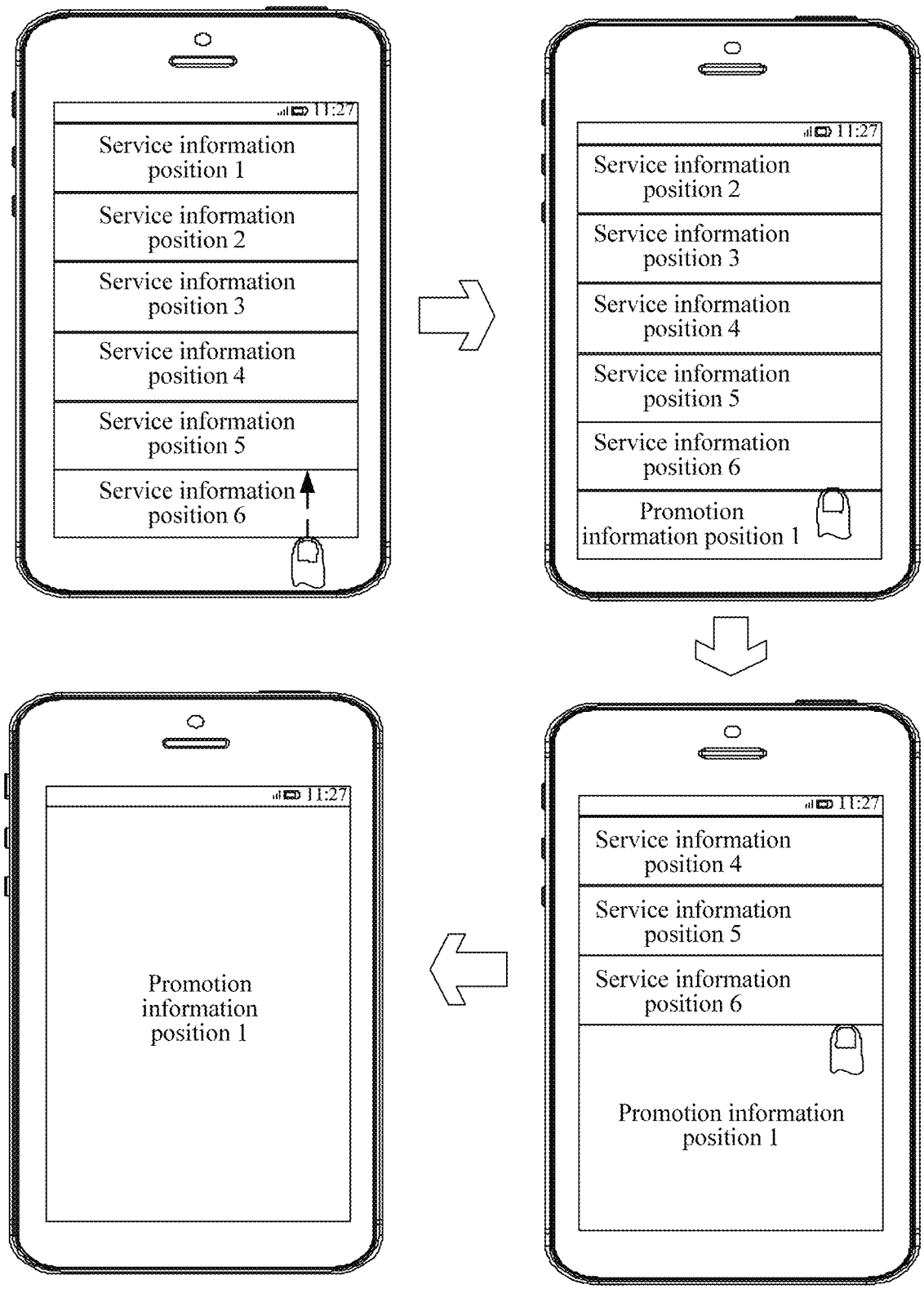
Figures 2, 7:
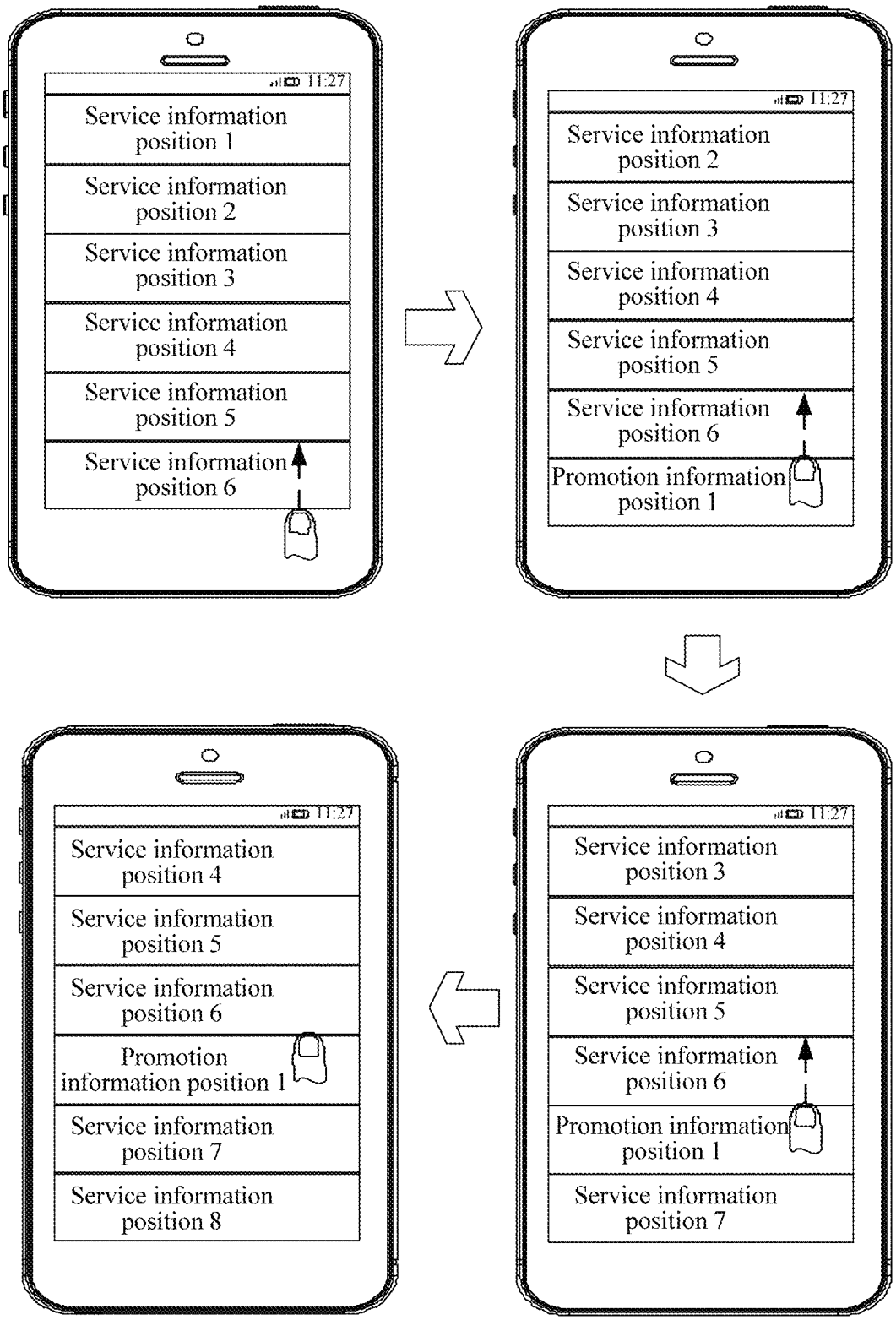
Figures 3, 7:
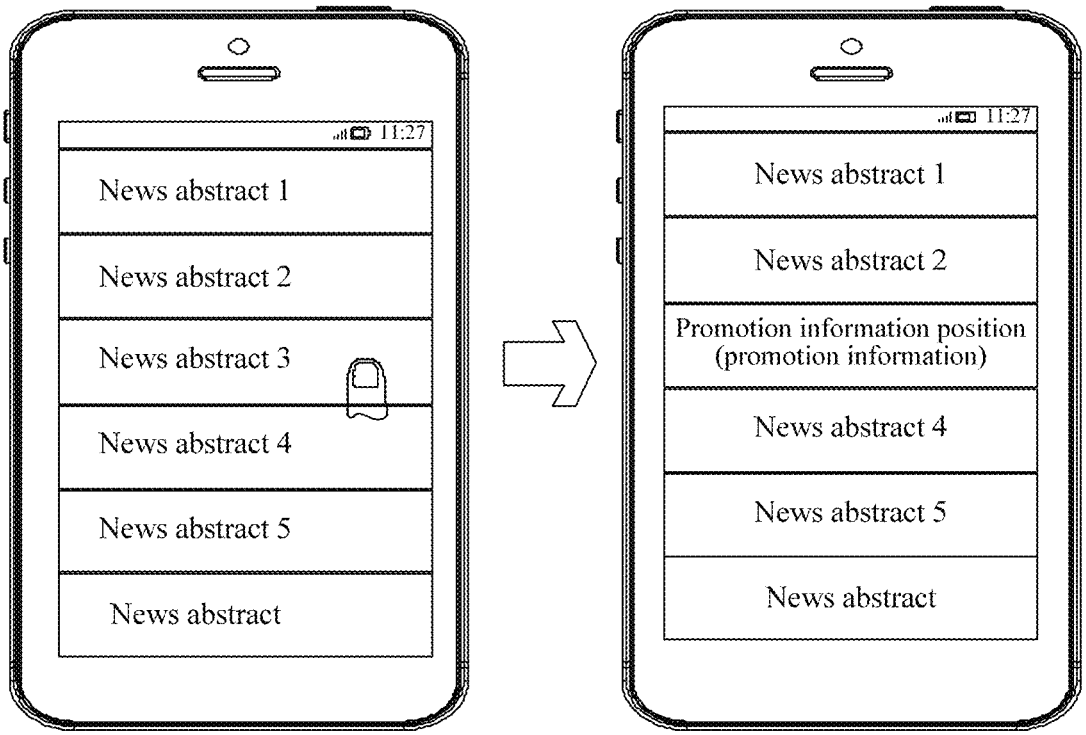
Figures 4, 7:
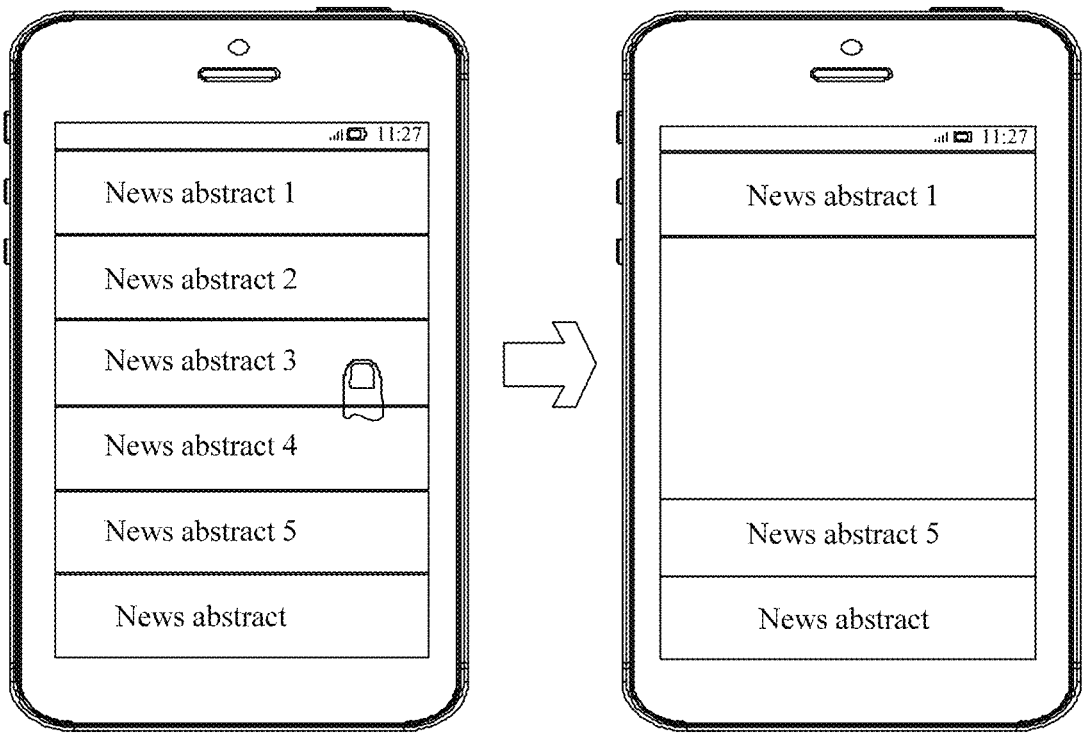

For example, as shown in FIG. 7-1 and FIG. 7-2, when the user slides a service information stream from bottom to top in the graphical interface of the application client, a promotion information position is loaded by sliding in at the bottom of the graphical interface, and an area in which the promotion information position is loaded in the graphical interface is consistent with an amplitude of the slide operation of the user, until the user performs plenty of slide operations to completely load the promotion information position in the graphical interface.

For example, as shown in FIG. 7-1 and FIG. 7-2, the promotion information position may use a full screen mode, and when the user performs plenty of slide operations, the promotion information position completely covers the graphical interface of the application client. The promotion information position may use a non-full-screen mode, and when the user performs plenty of slide operations to completely load the promotion information position in the graphical interface of the application client, both the promotion information position and the service information position are loaded in the graphical interface of the application client.

In another example embodiment, a matching promotion information position is loaded for the focusing operation scene. In response to an operation of focusing target service information to view content included in the service information by the user, a promotion information position is loaded in the graphical interface of the application client in a manner of at least covering a service information position of the target service information. For example, a promotion information position is loaded in the graphical interface of the application client in a manner of covering a service information position of a target service, or a promotion information position is loaded in the graphical interface of the application client in a manner of covering a target service information position and multiple adjacent service information positions (or all service information positions).

For example, as shown in FIG. 7-3 and FIG. 7-4, when browsing various news abstracts in a news stream in the news client, the user finds news (news 3) that interests the user and taps to read specific content of the news. After the user taps to read an abstract of the news, as shown in FIG. 7-3, a promotion information position covers a service information position of the abstract of the news, or as shown in FIG. 7-4, a promotion information position covers service information positions of the abstract of the news and abstracts of adjacent news (news abstracts 2 and 4).

In still another example embodiment, a matching promotion information position is loaded for operation scene switching. When it is determined that an operation scene that an operation performed by the user on service information satisfies is switched, a promotion information position is loaded in the graphical interface of the application client. For example, the promotion information position is loaded in a full screen mode in the graphical interface of the application client, or the promotion information position is loaded in a manner of inserting the promotion information position to service information positions in the graphical interface.

After the promotion information is presented at the promotion information position, revoking of loading of the promotion information position is further involved. Particularly, as shown in FIG. 7-2, when the promotion information position is loaded in a non-full-screen mode in a manner of being embedded between service information positions, an operation of revoking loading of the promotion information position may be not performed, that is, a connection relationship between the promotion information position and an adjacent information position is remained. In example embodiments, an operation of revoking loading of a promotion information position in any form may be performed. Referring to a schematic flowchart of an information processing method shown in FIG. 5-2, the method includes the following step:

Step 209: The terminal detects that the presented promotion information satisfies a corresponding revoking condition, and revokes loading of the promotion information position in the application client.

In an example embodiment, after the promotion information is presented at the promotion information position in the application client, timing is started. When duration for which the promotion information is loaded at the promotion information position reaches predetermined duration, loading of the promotion information position is revoked to resume a display state of the graphical interface of the application client before the promotion information position is loaded. Duration for presenting the promotion information is controlled so that a case in which the promotion information is presented for a long time without causing interference to obtaining the promotion information by the user is achieved.

For example, after the news client loads the promotion information at the promotion information position in a full screen form, timing is started. When a presentation time of the promotion information does not reach a presentation time indicated by presentation logic, that is, it is determined that a condition for revoking loading of the promotion information position is not satisfied, the promotion information position is in an inoperable state. When a presentation time of the promotion information reaches a presentation time indicated by presentation logic, that is, it is determined that a condition for revoking loading of the promotion information position is satisfied, when the user performs a slide operation on the promotion information position, for example, a slide operation from bottom to top, in response to the slide operation performed by the user on the promotion information, loading of the promotion information position is revoked by sliding out of the graphical interface at the second end of the graphical interface of the application client.

In another example embodiment, after the promotion information is presented at the promotion information position in the application client, that is, whether there is a focusing operation event such as a touch and tap event or a mouse click event for the promotion information is listened to, and if a corresponding tap event is obtained by listening, processing is performed according to corresponding presentation logic of the promotion information, for example, a corresponding landing page is jumped to. If a focusing operation event for the promotion information is not obtained by listening within a predetermined waiting time, it indicates that the user is not interested in the promotion information, and loading of the promotion information position is revoked, to prevent interference to obtaining service information by the user.

In another example embodiment, presentation logic of the promotion information allows the user to close the promotion information presented at the promotion information position, and correspondingly, when the promotion information is presented at the promotion information position, a virtual switch is further presented for the promotion information. When the promotion information is presented at the promotion information position, the user may press the virtual switch once the user does not expect to view the promotion information, and correspondingly, a close event for the promotion information position is obtained by listening in the application client, and in response, the promotion information position is revoked.

Figure 8:
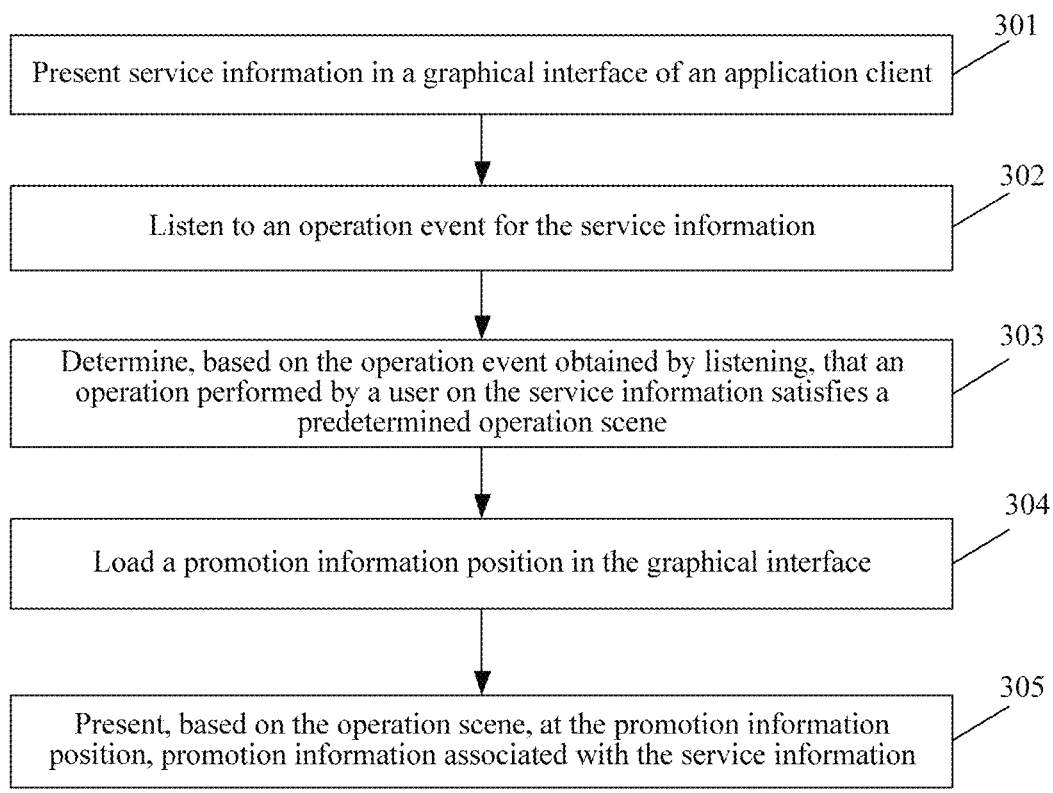
FIG. 8 is another schematic flowchart of an information processing method according to an example embodiment.

Referring to an information processing method shown in FIG. 8, referring to a schematic flowchart of an information processing method according to an example embodiment shown in FIG. 2, service information is presented in a graphical interface of an application client (step 301); an operation event for the service information is listened to (step 302); it is determined, based on the operation event that is obtained by listening, that an operation performed by a user on the service information satisfies a predetermined operation scene (step 303); a promotion information position is loaded in the graphical interface (step 304); and promotion information associated with the service information is presented, based on an operation scene, at the promotion information position (step 305).

In an example embodiment, first, promotion information related to service information is loaded, based on an operation scene, at a promotion information position so that the promotion information is loaded in a targeted manner in a suitable operation scene, and loading of the promotion information position and processing on presentation of the promotion information may be "seamlessly" connected to a current operation scene of a user, thereby preventing a problem in a related technology that promotion information is presented to a user in a "brute" form such as a pop-up window that causes interference; second, information loaded at the promotion information position is associated with service information to achieve an effect of "immersing" in the operation scene by using presentation of the promotion information as a part of the operation scene, and the promotion information may meet, to the greatest extent, a current requirement for obtaining information by the user to reduce interference to obtaining the service information by the user.

Figures 1, 9:
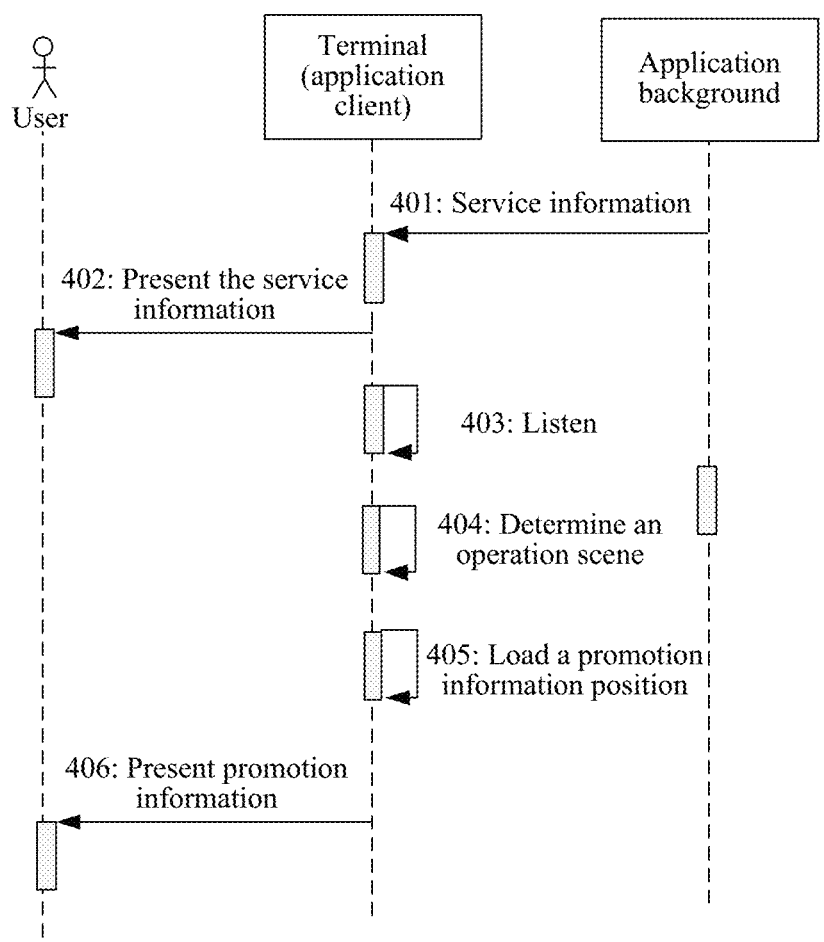
Figures 2, 9:
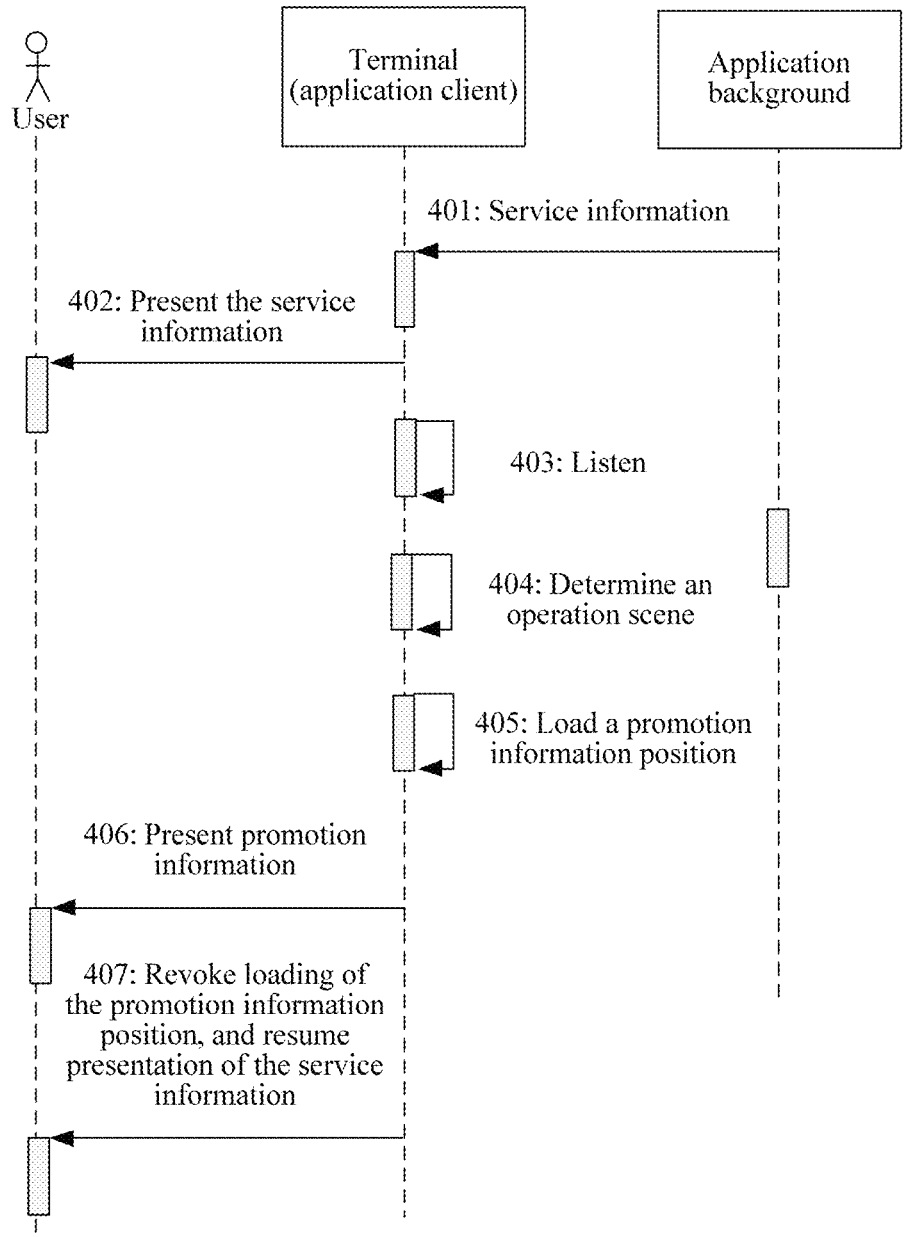
Figures 3, 9:
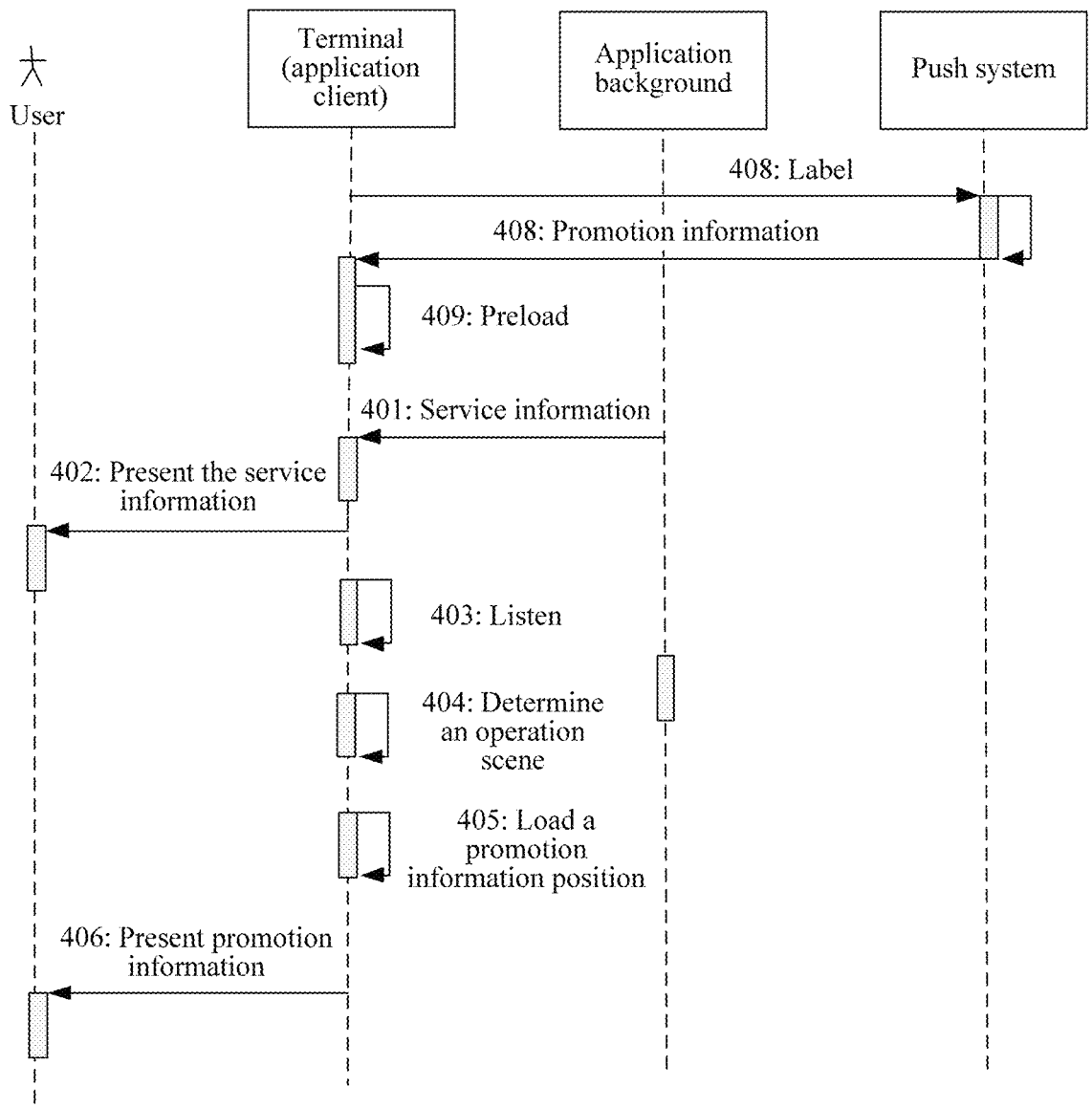

Referring to a schematic flowchart of an information processing method shown in FIG. 9-1, the method includes the following steps:

Step 401: An application client in a terminal obtains service information of a supported service from an application background.

As described above, multiple types of application clients such as a social client and a news client may be run in the terminal.

For example, each application client pulls service information of a target service (such as any service supported by the application client or a service that a user needs to use) from a corresponding application background at an interval (periodically or aperiodically), for example, the social client obtains a status of a friend of a user from a social background, or the news client obtains news from a news background, or each application client receives service information actively delivered by a corresponding application background.

Step 402: The terminal presents service information in a graphical interface of an application client.

For example, when in response to a user operation, the application client in the terminal is switched to a foreground running state (for example, for a mobile terminal, generally, the graphical interface of the application client is in a full screen state, and certainly, may also be in a non-full-screen state), content of the service information is loaded in the graphical interface of the application client.

After the service information is presented in the graphical interface of the application client, an operation event generated for the operation performed by the user on the service information is listened to to determine an operation scene of the user. Descriptions are provided below with reference to step 405 and step 406.

Step 403: The terminal listens to an operation event for the service information.

As described above, the operation event of the user for the operation type of the service information may be a touch operation event (such as a tap operation event or a slide operation event), or may be a voice control event, a keyboard event, a mouse event, or the like; and operation events of various types are records of operations performed by the user on service information in the application client.

For example, an operation performed on service information in the application client on a user side causes an event that is reported by a corresponding I/O on a hardware layer of user equipment to a system layer, for example, when the user performs a touch operation on an operation object, a corresponding touch event is generated, including operation data such as a specific position and a time of the user operation and a type of the touch operation. Similarly, when the user performs a voice control operation on an operation object in the application client, a corresponding voice control event is generated, including an identifier of the operation object on which the user performs the voice operation, an operation manner, and the like.

Step 404: The terminal determines, based on the operation event obtained by listening, that an operation performed by a user on the service information satisfies an operation scene.

The operation may be performed by the user on the service information in the graphical interface of the application client in a particular operation scene. In an example embodiment, a machine learning method is used to train a model used to identify an operation scene, for example, a neural network model, and the neural network model is used to predict a satisfied operation scene based on an operation event obtained by listening.

For example, some known operation scenes and corresponding operation events are used as training samples, such as {slide operation event from bottom to top in the graphical interface, browsing operation scene} and {slide operation event from bottom to top in the graphical interface, browsing operation scene} with marks (a corresponding operation scene and an operation event), of an operation identification model. The machine learning method is used to train the neural network model, so that the trained neural network model has performance of predicting an operation scene based on an operation event.

Using an example in which the neural network model is trained, a neural network model shown in FIG. 6 is created, and is used to predict an operation scene of the user based on an operation event obtained by listening. An input layer is responsible for receiving an input training sample and distributing the training sample to a hidden layer; the hidden layer is responsible for forming a mapping between a feature of an operation event and an operation scene; and a parameter (weight) of a hidden node in the mapping relationship formed by the hidden layer is adjusted based on a deviation between an output prediction result of an operation scene and an actual result of the operation scene, until the deviation meets a functional requirement.

A feature (such as a type of an operation object in a touch operation event or an operation manner) of a training sample input by the input layer of the neural network model is a derived variable; and a mapping relationship between the variable and an operation scene is learned on the hidden layer of the neural network model, to achieve performance of outputting an operation scene predicted based on an operation event on the output layer of the neural network. After the neural network is completely trained, the operation event obtained by listening is input to the neural network, to obtain a prediction result of the operation scene.

For example, the operation scene may include:

1) a browsing operation scene in which the service information is updated by using a slide operation, where for example, if continual operations of sliding upward are performed in the graphical interface of the news client to view other news in a news stream, the operation scene identification model is operated to identify that the user is in the browsing operation scene;

2) a focusing operation scene in which the service information is focused on by using a touch operation, where using a touch operation as an example, in a screen-on state, a finger of the user presses a piece of service information for a long time (exceeding a specified focusing time threshold such as 5 seconds), the operation scene identification model is operated to identify that the user performs a focusing operation on the service information.

It should be noted that, during actual application, the operation scene is not limited to the foregoing examples, and for example, further includes a sharing operation scene (for example, sharing with a social group), a forwarding operation scene in which service information is forwarded, and a comment operation scene in which a comment is made on service information. In addition, during actual application, operation scenes are diversified, and the operation scene may be a composite operation scene formed by combining the foregoing operation scenes, for example, a forwarding and comment operation scene in which service information is forwarded and a comment is made on the service information.

In this example embodiment, the foregoing operation scenes are referred to as common operation scenes. In addition, the user operation may further satisfy such a switching operation scene, that is, the user performs switching between the foregoing common operation scenes, for example, including switching between operation scenes in the following several forms:

1) A Browsing Operation Scene→a Focusing Operation Scene

Using an example in which the user uses the news client in the terminal, the news client presents abstracts of some news in a news stream at multiple service information positions, to form a news stream. When the user rapidly browses the abstracts of the news in the news stream (in this case, in an operation scene of a slide operation) and finds news that interests the user, the user taps the corresponding news to read specific content of the news ((in this case, in a focusing operation scene).

2) A Focusing Operation Scene→a Browsing Operation Scene

Still using the example in which the user uses the news client in the terminal, after the user reads a piece of news completely and returns to an interface of the news stream, the user continues to browse the abstracts of the news in the news stream to find content that interests the user.

3) A Browsing Operation Scene→a Focusing Operation Scene→a Sharing Operation Scene Using an example in which the user uses the social client in the terminal, the social client presents, at service information positions in the graphical interface, statuses shared by friends, to form a friend status stream. The user browses the statuses in the status stream, finds a status that interests the user, taps to read specific content, and forwards the status to another friend of the user during reading.

Step 405: The terminal loads a promotion information position in the graphical interface of the application client.

In an example embodiment, the user performs a touch operation (for example, tapping or sliding) at a position in the graphical interface, and the terminal loads, at a position in the graphical interface at which a touch event for service information is correspondingly received, a promotion information position in a manner of inserting the promotion information position to service information. For example, at one or at least one of the bottom, the top, the left and the right (for example, the upper left or the bottom right) of the position in the graphical interface at which the touch event is received, the promotion information position is loaded by means of insertion. It should be noted that, the promotion information position is a frame (which may also be considered as a layer) in the graphical interface that is used to present the promotion information, and has an attribute of being invisible. Therefore, when the promotion information is presented at the promotion information position in a subsequent step 408, an effect that the promotion information is "integrated" with the service information may be achieved. From the perspective of the user, the application client presents the promotion information in a same manner for service information that needs to be obtained by the user, and it is difficult to clearly distinguish between the service information and the promotion information, to make the promotion information content-enabled; and compared with presenting pushed information by using a pop-up window, a patch, or another manner in a related technology, it is more acceptable for the user, thereby reducing interference to the user.

Figures 1, 10:
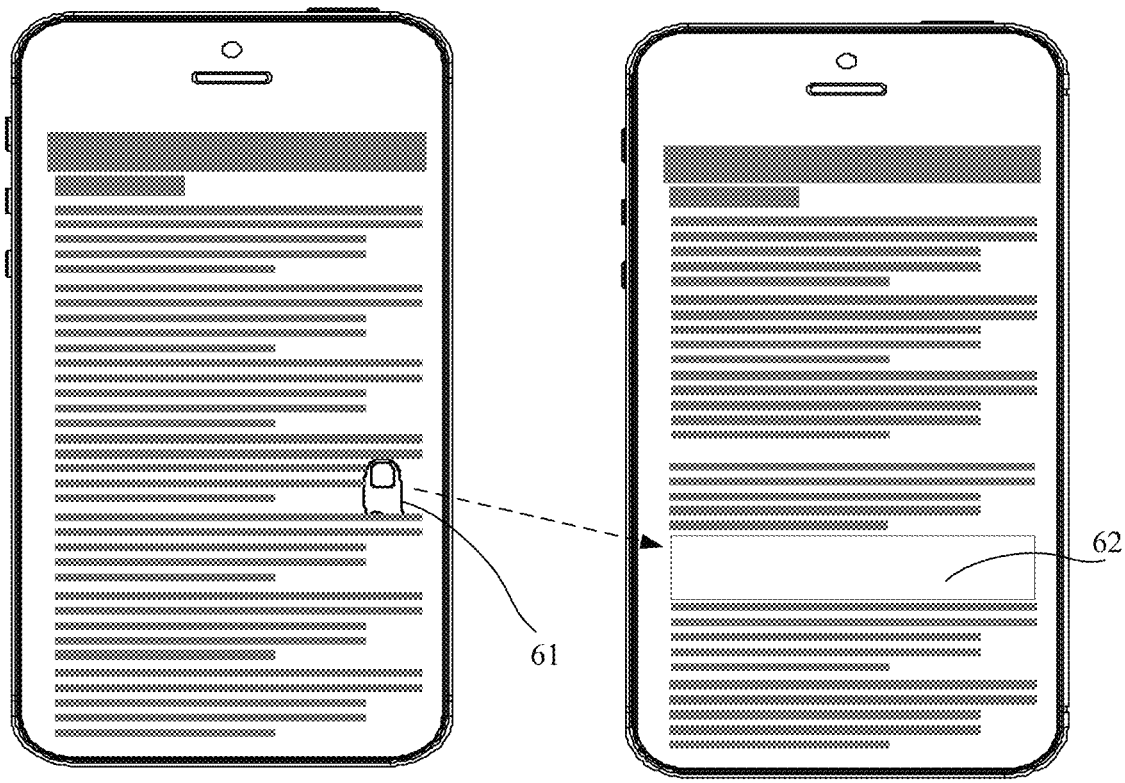
Figures 2, 10:
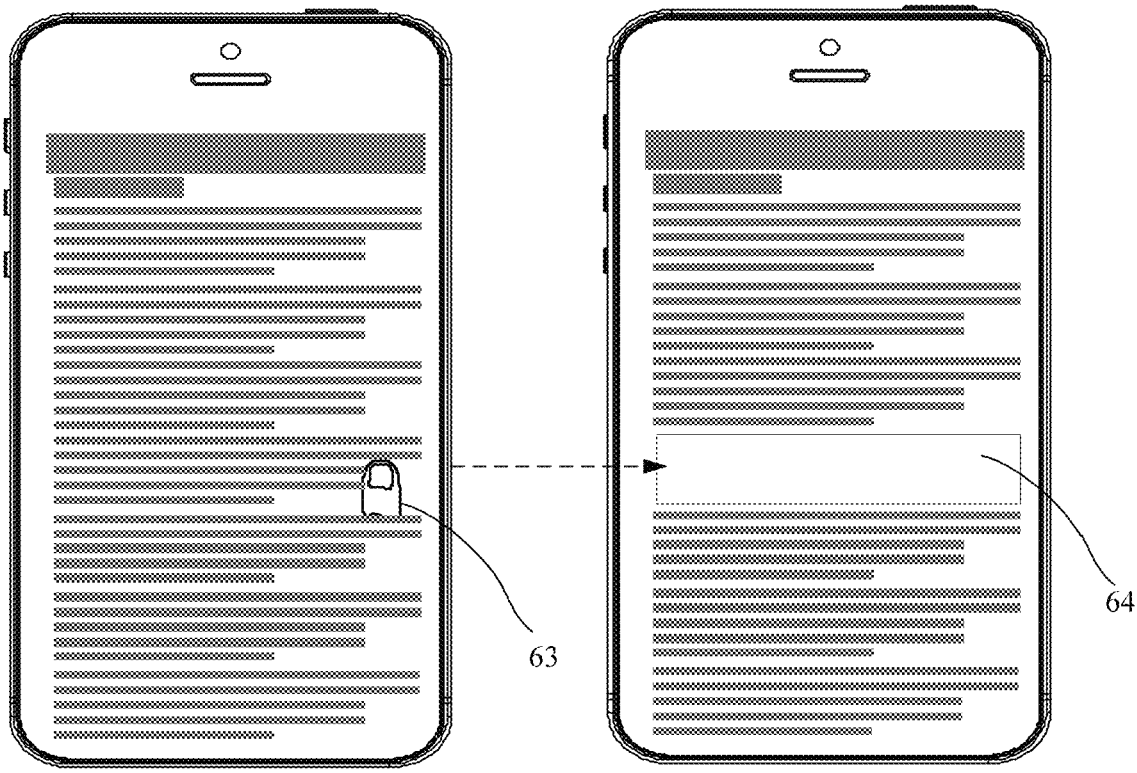
Figures 3, 10:
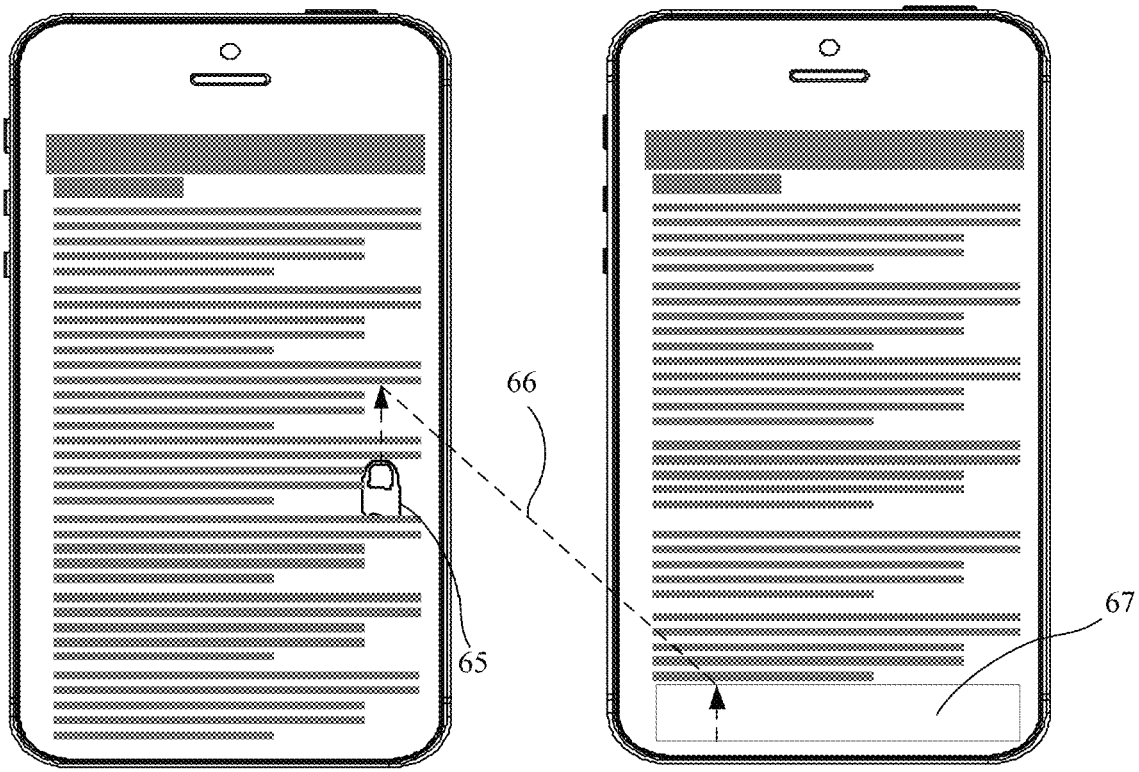
Figures 4, 10:
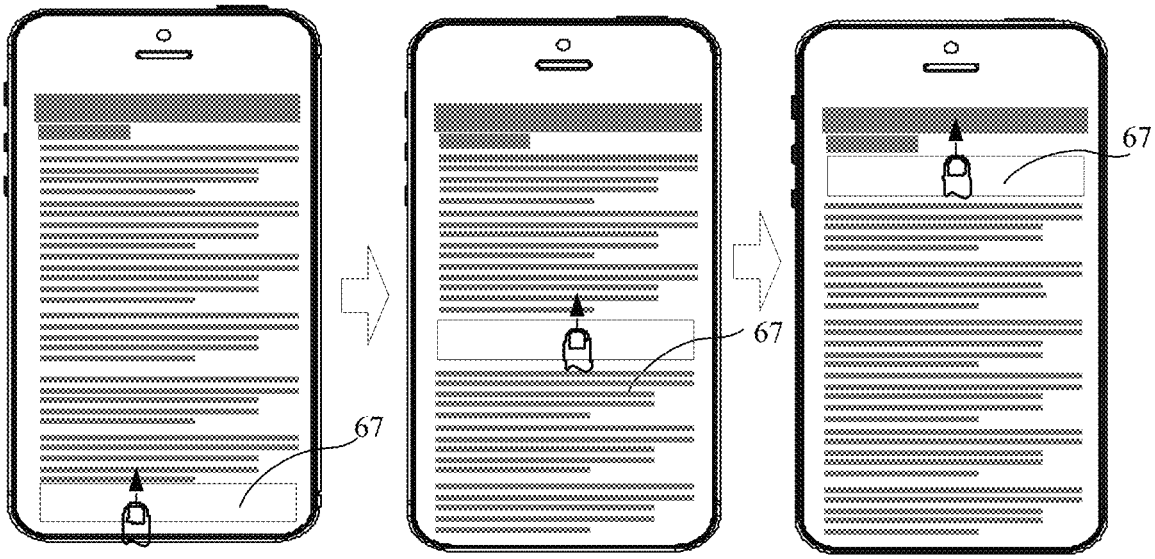

For example, as shown in FIG. 10-1, service information is presented in the graphical interface of the application client in a user side terminal. When the user performs a slide operation (for example, sliding upward or downward or sliding in another manner, or a tap and touch operation such as a single tap or a double tap) at a position 61, the application client obtains by listening a corresponding operation event, and all display areas of a promotion information position 62 are immediately inserted below the corresponding position 61 at which the operation event is obtained by listening, and certainly, all the display areas of the promotion information position 62 may be inserted above the corresponding position 61 at which the operation event is obtained by listening or to another adjacent position.

In another example embodiment, a promotion information position is loaded, at a position in the graphical interface at which a touch event for service information is correspondingly received, in a manner of covering at least some service information.

For example, the promotion information position is loaded, at the position in the graphical interface at which the touch event is received, in a manner of covering some service information at the position, for example, a layer is covered on some service information at the position. It may be understood that, the promotion information position is a frame in the graphical interface that is used to present the promotion information and has an attribute of being invisible. Therefore, when the promotion information is presented at the promotion information position in a subsequent step 408, an effect that the promotion information is "integrated" with the service information may be achieved. From the perspective of the user, the application client presents the promotion information in a same manner for service information that needs to be obtained by the user, and it is difficult to clearly distinguish between the service information and the promotion information, to make the promotion information content-enabled; and compared with presenting pushed information by using a pop-up window, a patch, or another manner in a related technology, it is more acceptable for the user, thereby reducing interference to the user.

For example, as shown in FIG. 10-2, service information is presented in the graphical interface of the application client in a user side terminal. When the user performs a touch operation (such as a tap and touch operation) at a position 63, the application client obtains by listening a corresponding operation event, and loads a promotion information position 64 in a manner of covering a layer on the position 63, to cover some service information at the position 63. A part of the service information at the position 63 is in an invisible state.

In another example embodiment, different from that all areas of a promotion information position are immediately loaded in the graphical interface when a touch event is obtained by listening in the graphical interface in FIG. 10-1 and FIG. 10-2, when the touch event is a slide operation event, the promotion information position is not immediately loaded when a tap operation event is obtained by listening, but when the slide operation event is obtained by listening, the promotion information position is progressively loaded in the graphical interface based on a direction and an amplitude of the slide operation. For example, the following manner is used:

In a browsing operation scene in which the user updates service information by using a slide operation, in response to the slide operation performed by the user on the service information, a promotion information position is loaded by sliding in the graphical interface at a first end (the first end is one end to which a direction of the slide operation of the user in the graphical interface of the application client is opposite) of the graphical interface of the application client, and presentation of some service information is revoked by sliding out of the graphical interface at a second end (the second end is one end to which the direction of the slide operation of the user in the graphical interface of the application client points) of the graphical interface of the application client, until all areas of the promotion information position are loaded, to prevent a problem that interference may be caused to the user if all the areas of the promotion information position are loaded at a time when a touch event is obtained by listening.

For example, in a browsing operation scene in which the user updates service information by using a slide operation, as shown in FIG. 10-3, at an amplitude 66 of sliding upward by the user at a position 65, a promotion information position (or some promotion information positions) 67 is loaded by sliding in at the amplitude 66 at the bottom of the graphical interface, and presentation of some service information corresponding to the amplitude 66 is revoked by sliding out at the second end of the graphical interface.

Step 406: The terminal presents, based on the operation scene, at the promotion information position, promotion information associated with the service information.

In an example, promotion information is associated with currently displayed content of service information in the graphical interface, or associated with context of currently displayed content.

In an example, keywords may be acquired from service information and promotion information to perform matching, so as to determine promotion information associated with service information currently presented in the graphical interface of the application client.

For example, a semantic analysis method is used to extract a keyword from the service information currently presented in the graphical interface of the application client to perform matching with a label of a video advertisement (representing a directing condition of the video advertisement), and a video advertisement that succeeds in the matching is used as associated promotion information.

In a typical example, promotion information may be associated with a subject of service information, a character or a plot involved in the service information, or the like.

For example, when the service information is an article about evaluation on a notebook computer of a specific model, the promotion information may be a video advertisement of the notebook computer of the model or a notebook computer of a newer model.

For another example, when the service information is a chapter of a novel, the associated promotion information may be an online game advertisement designed according to the plot.

Processing on promotion information presented at a promotion information position is described below with reference to different operation scenes.

In an example embodiment, in a browsing operation scene in which the user updates service information by using a slide operation, promotion information associated with content adjacent to a touch point of the slide operation performed by the user and/or context of the adjacent content is presented at a promotion information position.

For example, the adjacent content may be content that has a predetermined distance (for example, a predetermined quantity of paragraphs, words, or lines of words) to the touch point and that is in the service information displayed in the graphical interface of the application client, and the context of the adjacent content may be a full text of the content, a keyword of the adjacent content that is extracted based on a semantic analysis method, a subject of the adjacent content, a character involved in the adjacent content, or the like.

For example, assuming that a paragraph 9 to a paragraph 13 of the service information are presented in the graphical interface by the application client, and the touch point of the user is located in blank space between the paragraph 11 and the paragraph 12, the adjacent content may be content of the paragraph 11 and the paragraph 12; and certainly, the adjacent content may also be the paragraph 9 to the paragraph 13. A longer predetermined distance used to determine adjacent content indicates a larger quantity of obtained promotion information. During actual application, the predetermined distance may be set according to a requirement for a quantity of promotion information to be pushed.

In some example embodiments, the context of the adjacent content may be service information related to the service information currently presented in the application client, for example, a series of news reports or a serial story.

In another example embodiment, in a focusing operation scene in which the user focuses service information by using a touch operation, promotion information associated with content marked by the user and/or context of the marked content is presented at a promotion information position.

The marked content may be content annotated by the user in the graphical interface of the application client, favorite content, or the like; and the context of the marked content may be a subject or a keyword of or a character involved in the marked content, or the like. When the user reads (focuses on) the service information, the promotion information related to the content marked by the user is presented, so that a hit ratio for a current requirement for obtaining information by the user is increased significantly, and a channel for obtaining information by the user may be expanded.

For example, when the user performs a marking operation on a news report about real estate sales in read news (in a marking operation scene), a real estate sales advertisement in a region of the user is presented at a promotion information position.

In another example embodiment, in a forwarding operation scene in which the user forwards service information, promotion information associated with content forwarded by the user and/or context of the forwarded content is presented at a promotion information position.

The forwarded content is content selected and forwarded (for example, forwarded to a friend or shared to a personal status) by the user in the graphical interface of the application client; and the context of the forwarded content is a subject or a keyword of or a character involved in the forwarded content.

In an example in which a promotion information position is loaded and promotion information is presented, when the user performs a slide operation from bottom to top in the graphical interface of the application client, according to an amplitude of sliding by the user, a promotion information position consistent with the amplitude is loaded at the bottom of the application client to achieve an effect that the promotion information position "slides out" from the bottom of the graphical interface, and the promotion information position may use a full screen mode or a non-full-screen mode. After the promotion information position is completely loaded in the graphical interface of the application client, if the user continues to perform a slide operation from bottom to top, the application client continues to load service information after the promotion information position, to achieve an effect of inserting a promotion information position between service information. The promotion information presented at the promotion information position is "integrated" with the service information loaded at the service information position, that is, an effect that the promotion information is presented in a content form consistent with the service information is achieved.

After the promotion information is presented at the promotion information position, revoking of loading of the promotion information position is further involved. Particularly, when the promotion information position is loaded in a non-full-screen mode, an operation of revoking loading of the promotion information position may be not performed, that is, a connection relationship between the promotion information position and an adjacent service is remained. Certainly, an operation of revoking loading of a promotion information position in any form may be performed. Referring to a schematic flowchart of an information processing method shown in FIG. 9-2, the method includes the following step:

Step 407: Revoke loading of the promotion information position in the graphical interface, and resume presentation of the service information in an area originally occupied by the promotion information position.

In an example embodiment, when the terminal detects the presented promotion information satisfies a corresponding revoking condition, loading of the promotion information position is revoked in the graphical interface of the application client. In response to a direction and an amplitude of a slide operation performed by the user on the promotion information, in the graphical interface at the amplitude of the slide operation, the promotion information position is moved out of the graphical interface of the application client at the amplitude of the slide operation to gradually reduce the promotion information position.

For example, referring to FIG. 10-4, the user drags the promotion information position (at which the promotion information is presented, not shown in FIG. 10-4) to slide upward to view subsequent content of the service information. According to a direction of sliding by the user, in synchronization with an amplitude of sliding by the user, the promotion information position is moved to the top of the graphical interface until the promotion information position is moved out of the graphical interface.

Descriptions are provided below with reference to different examples of the revoking condition.

Example 1

After the promotion information is presented at the promotion information position in the application client, timing is started. When duration for which the promotion information is loaded at the promotion information position reaches predetermined duration, loading of the promotion information position is revoked, to resume a display state of the service information in the graphical interface of the application client before the promotion information position is loaded. Duration for presenting the promotion information is controlled so that a case in which the promotion information is presented for a long time without causing interference to obtaining the promotion information by the user is achieved.

For example, after the news client loads the promotion information at the promotion information position in a non-full-screen form shown in FIG. 10-1, timing is started. When a presentation time of the promotion information reaches a presentation time indicated by presentation logic, that is, it is determined that a condition for revoking loading of the promotion information position is satisfied, loading of the promotion information position is revoked and the service information continues to be presented in an area originally occupied by the promotion information position. Certainly, when the presentation time indicated by the presentation logic is not reached, the user may move, by dragging, the promotion information position out of the graphical interface, as shown in FIG. 10-4, to achieve an objective of revoking loading of the information position.

Example 2

After the promotion information is presented at the promotion information position in the application client, that is, whether there is a focusing operation event such as a touch and tap operation event or a mouse click operation event for the promotion information is listened to, and if a corresponding tap operation event is obtained by listening, processing is performed according to corresponding presentation logic of the promotion information, for example, a corresponding landing page is jumped to. If a focusing operation event for the promotion information is not obtained by listening within a predetermined waiting time, it indicates that the user is not interested in the promotion information, and loading of the promotion information position is revoked, to prevent interference to obtaining service information by the user.

Example 3

Presentation logic of the promotion information allows the user to close the promotion information position, and correspondingly, when the promotion information is presented at the promotion information position, a virtual switch is further presented for the promotion information position. When the promotion information is presented at the promotion information position, the user may press the virtual switch once the user does not expect to view the promotion information, and correspondingly, a close event for the promotion information position is obtained by listening in the application client, and in response, the promotion information position is revoked.

In an example embodiment, the promotion information may be preference information satisfying the user, and the promotion information is made to satisfy the user to the greatest extent. Based on FIG. 9-1, referring to a schematic flowchart of an information processing method shown in FIG. 9-3, the method further includes the following steps:

Step 408: The application client in the terminal obtains, from a push system, promotion information matching a user label of a user.

For example, when the application client in the terminal is in a running state, the application client reports the user label of the user to the push system; and the push system determines, according to a directing condition that is set by each promotion information push user for promotion information that needs to be pushed, a label satisfying the directing condition, and delivers corresponding promotion information to the application client in the terminal.

Step 409: The application client in the terminal preloads the promotion information.

The application client preloads the promotion information in a cache of the application client, so that efficiency of presenting the promotion information at the required promotion information position subsequently may be improved.

In an example embodiment, promotion information obtained from the push system is preloaded in the cache of the application client according to an obtaining sequence, and is read according to a ranking of the promotion information in the cache in a subsequent step.

In another example embodiment, promotion information obtained from the push system is sorted according to a particular dimension. For example, the dimension includes:
1) a space-time dimension: performing sorting in descending order of relevance between promotion information and users in a space-time dimension, where
using an example in which promotion information is news, relevance with a current time and position of a user is calculated according to a mark of the space-time dimension carried in the news, so that an effect that promotion information matching space and a time of the user is exposed in priority may be achieved; and
2) a preference dimension: performing sorting in descending order of matching degrees between promotion information and user preferences, where
using advertisements as an example, sorting is performed according to similarities between products promoted in the advertisements and products preferred by users, so that an effect that an advertisement preferred by a user is exposed in priority may be achieved.

An example embodiment provides an information processing apparatus, including: a service information unit, configured to present service information in a graphical interface of an application client; a listening unit, configured to listen to an operation event for the service information; an operation scene unit, configured to determine, based on the operation event obtained by listening, that an operation performed by a user on the service information satisfies an operation scene; and a promotion information unit, configured to present, in the graphical interface, promotion information by using a presentation parameter matching the operation scene.

The service information unit, the listening unit, the operation scene unit, and the promotion information unit may all correspond to a processor or a processing circuit. The processor or the processing circuit may execute executable code such as a computer program to implement any one of more of the foregoing information processing methods. The processor may be an application processor (AP), a CPU, a digital signal processor (DSP), an FPGA, or the like, but is not limited thereto.

In some example embodiments, the promotion information unit is further configured to: determine, based on the operation scene, at least one of a promotion information position, an attribute of presented information, a presentation manner, and the like; and present the promotion information position in the graphical interface, and present the promotion information at the promotion information position; and/or, present, in the graphical interface, the promotion information matching the information attribute; and/or, present the promotion information in the graphical interface in the presentation manner.

An example of pushing a video advertisement in a news client on a user side is used below to describe the foregoing information processing solution. It should be noted that, although the example of pushing a video advertisement is used for description, a person skilled in the art may push a video advertisement in an application client of another type and push an advertisement of another type based on the following records.

Figure 11:
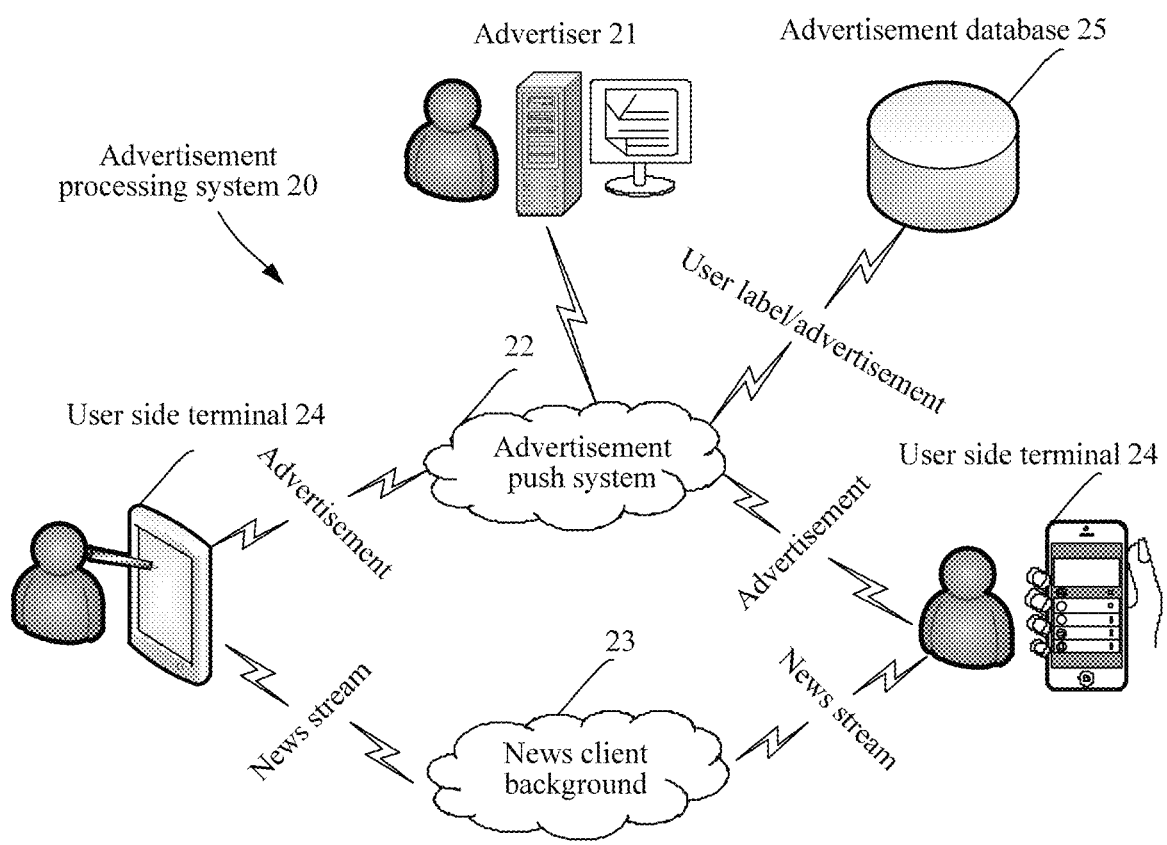
FIG. 11 is a schematic structural diagram of an advertisement push system according to an example embodiment.

The information processing system 10 shown in FIG. 1 is implemented as an advertisement push system 20 shown in FIG. 11. The advertisement push system 22 newly creates, in a locally maintained advertisement position (promotion information position) type, an advertisement position used to present a video advertisement when an article list is slid, and an advertiser 21 pushes a video advertisement of a length of 15 s at the advertisement position. After the pushed video advertisement is examined and verified according to a related regulation for advertisement push, the video advertisement is synchronously delivered to a news client in a user side terminal 24.

During actual application, the advertisement push system 22 implements directed push of a video advertisement, generates a corresponding label for the advertisement according to a directing condition that is set by the advertiser 21 for the pushed video advertisement, performs maintenance in an advertisement database 25, forms, by using user data reported by the user side terminal 24, a label representing a user feature, and performs matching with a label of a video advertisement in the advertisement database 25 to determine the video advertisement that needs to be pushed.

The news client in the user side terminal 24 obtains a news stream from a news client background 23 and presents a news list in the news client.

Figures 1, 12:
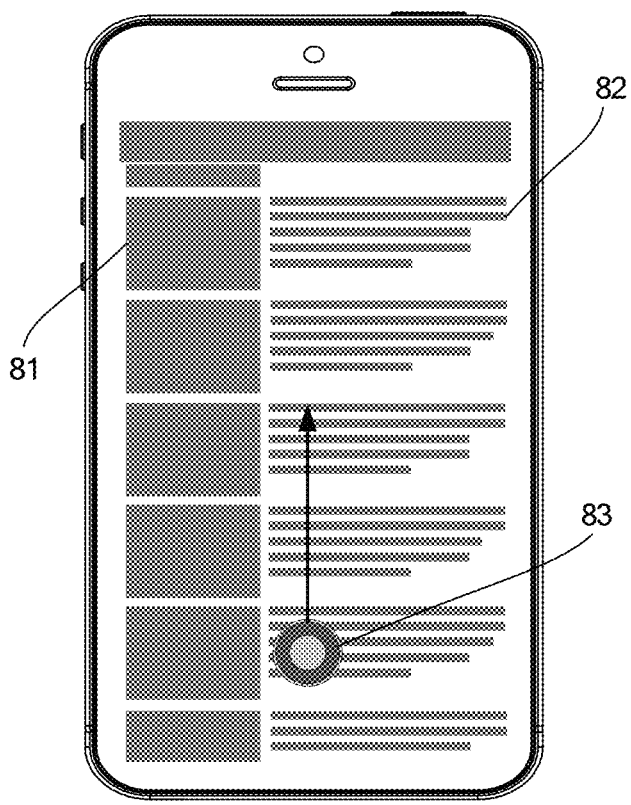
Figures 2, 12:
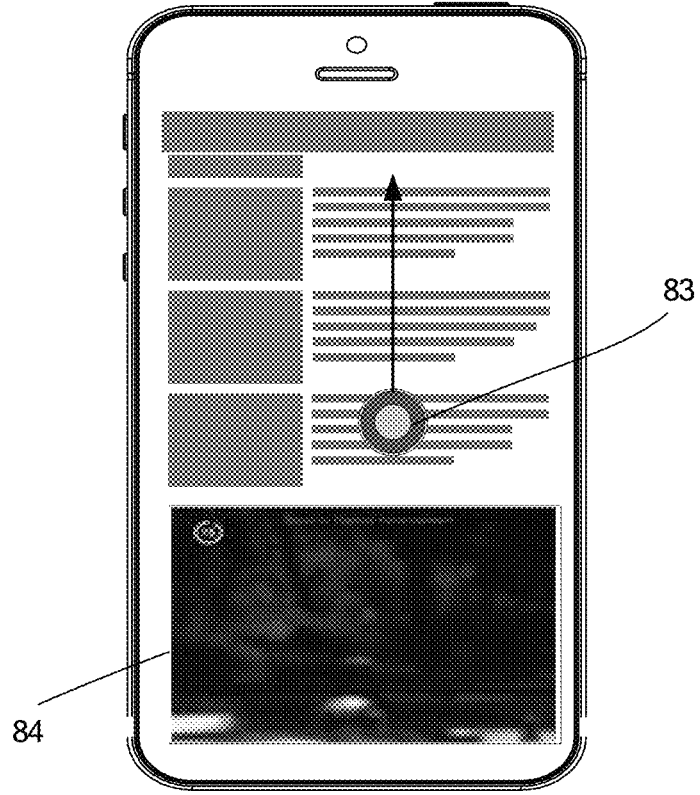
Figures 3, 12:
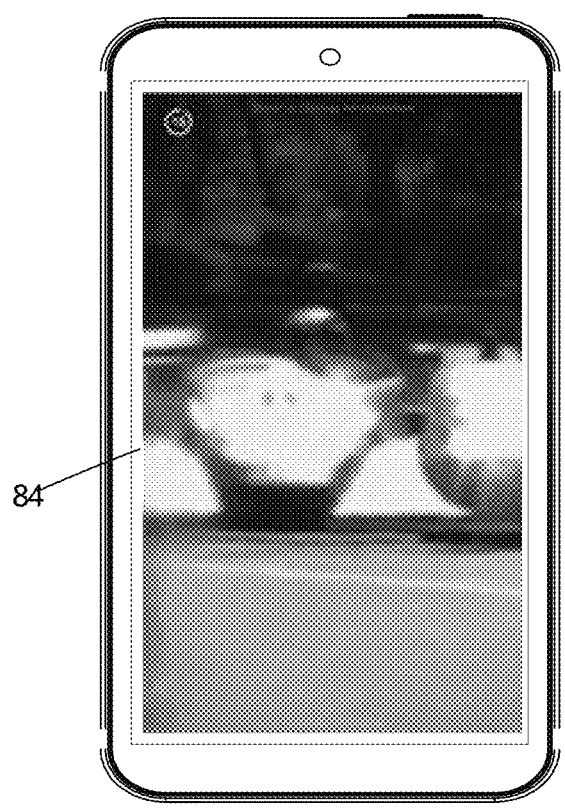
Figures 4, 12:
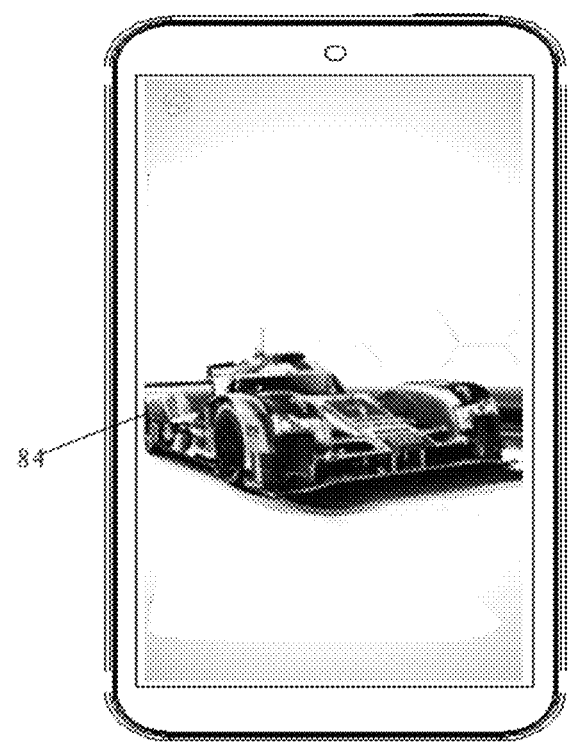
Figures 5, 12:
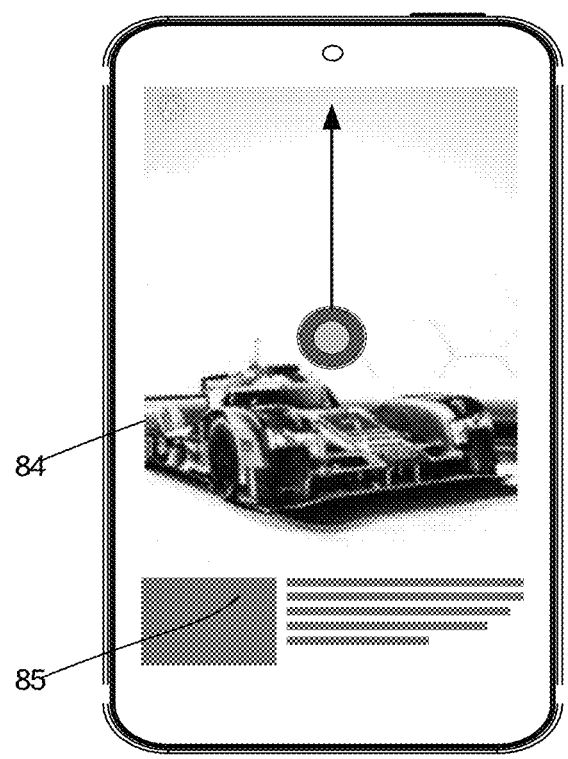
Figures 6, 12:
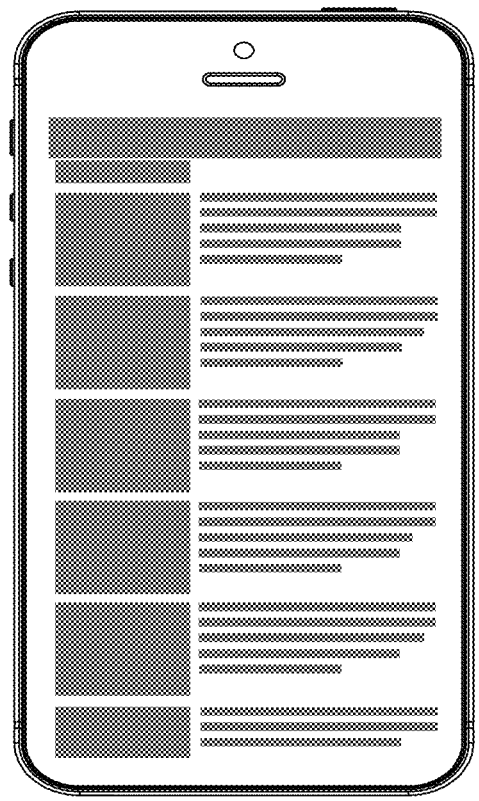

After the news client receives the video advertisement, as shown in FIG. 12-1, a user views a news (such as a news abstract 82 and an image 81) list, and if the user slides upward from a position of a news abstract 83 in the list, advertisement presentation logic is triggered. Referring to FIG. 12-2, as the user continually slides upward, an advertisement position of the video advertisement gradually slides out from the bottom of the graphical interface until an advertisement position in a full screen mode is formed, and a video advertisement 84 shown in FIG. 12-3 and FIG. 12-4 is played.

The news client plays the video advertisement of 15 s in a full screen mode, and after a countdown of 15 s ends, the video advertisement is paused. Referring to FIG. 12-5, when the user slides upward again from the advertisement position of the video advertisement, the advertisement position of the video advertisement gradually disappears in a manner of sliding out from the top of the graphical interface. If the user continues to slide upward, as shown in FIG. 12-6, the application client continues to present a news list 85 in a news stream.

A logical function structure of the foregoing information processing apparatus is described. Referring to a schematic structural diagram of an information processing apparatus 30 shown in FIG. 13, the apparatus includes:

- an obtaining unit 31 configured to obtain an information stream of a target service;
- a presentation unit 32 configured to present at least some service information in the information stream at a service information position of an application client;
- a listening unit 33 configured to listen to an operation event for the service information;
- a scene unit 34 configured to determine, based on the operation event obtained by listening, that an operation performed by a user on the service information satisfies an operation scene; and
- a promotion information unit 35 configured to load, between service information positions, a promotion information position matching the operation scene, and present the promotion information at the promotion information position.

In an example embodiment, the presentation unit 32 is further configured to present, according to a quantity of service information positions in the application client, an abstract of the service information in the information stream at a corresponding service information position according to particular sorting.

In an example embodiment, the scene unit 34 is further configured to perform prediction by using an operation scene identification model and based on the operation event obtained by listening, to obtain the operation scene that the operation performed by the user on the service information satisfies.

The operation scene includes at least one of the following:
- a browsing operation scene in which the service information is updated by using a slide operation;
- a focusing operation scene in which the service information is focused on by using a touch operation; and
- a forwarding and comment operation scene in which the service information is forwarded and a comment is made on the service information.

In an example embodiment, the promotion information unit 35 is further configured to: in response to a slide operation performed by the user on the service information, load the promotion information position by sliding in at a first end of the graphical interface of the application client, and revoke, by sliding out at a second end of the graphical interface of the application client, loading of the service information position.

In an example embodiment, the promotion information unit 35 is further configured to: in response to a focusing operation performed by the user on target service information, load the promotion information position in a manner of covering at least a service information position of the target service information.

In an example embodiment, the promotion information unit 35 is further configured to load a promotion information position in the graphical interface of the application client when it is determined that the operation scene that the operation performed by the user on the service information satisfies is switched.

In an example embodiment, the promotion information unit 35 is further configured to: detect that the presented promotion information satisfies a corresponding revoking condition, and revoke loading of the promotion information position.

In an example embodiment, the promotion information unit 35 is further configured to: determine, when at least one of the following conditions is satisfied, that the presented promotion information satisfies the corresponding revoking condition: detecting that duration for which the promotion information is presented at the promotion information position reaches predetermined duration; detecting that a focusing operation event for the promotion information is not obtained by listening within a predetermined waiting time; and obtaining by listening for a close event for the promotion information position.

In an example embodiment, the promotion information unit 35 is further configured to: in response to the slide operation performed by the user on the promotion information, revoke, by sliding out at the second end of the graphical interface of the application client, loading of the promotion information position.

In an example embodiment, the obtaining unit 31 is further configured to: before the promotion information is presented at the promotion information position, obtain promotion information matching a user label of a user;

The promotion information unit 35 is further configured to preload the promotion information.

Figure 13:
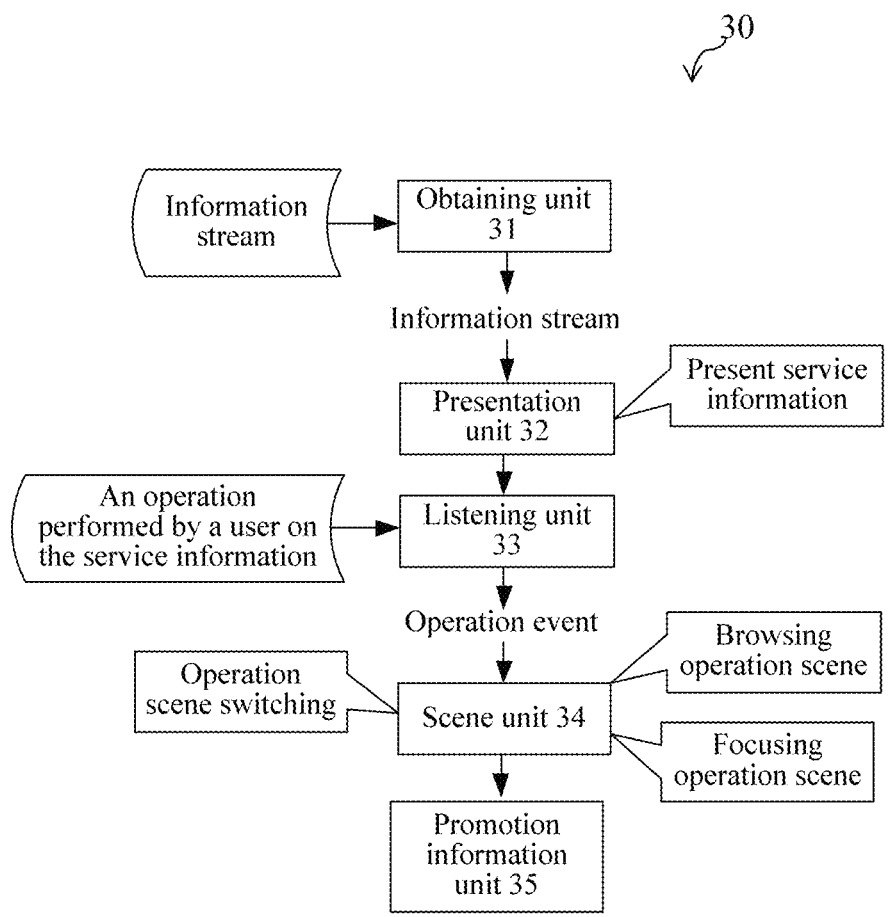
FIG. 13 is a schematic structural diagram of an information processing apparatus according to an example embodiment.

During actual application, from the perspective of hardware implementation, various units in the information processing apparatus 30 shown in FIG. 13 may be implemented by hardware resources on a terminal side shown in FIG. 3, such as a processor and a network interface.

In conclusion, the example embodiments may achieve the following beneficial effects:

1) In a particular operation scene, selective presentation is performed at a promotion information position, and no push is performed when the operation scene is not satisfied, so that interference to viewing service information by a user is reduced significantly.

2) A promotion information position matches an operation scene of the user; and for different operation scenes, a corresponding promotion information position is adaptively loaded to present the promotion information, so as to prevent a case in a related technology that interference is caused to a user when promotion information is presented by using a fixed manner such as a pop-up window or a patch.

3) When it is not detected that the user focuses on the promotion information, a close event is obtained by listening, or a presentation time of the promotion information exceeds predetermined duration, the promotion information is no longer presented, to prevent interference caused to obtaining the service information by the user.
4) The promotion information position is loaded between service information positions, and the promotion information is presented at the promotion information position, so that immersive integration of the promotion information in a graphical interface is implemented, that is, the promotion information is embodied in a content form; and compared with an advertisement form such as a pop-up window, resistance of the user to the promotion information is reduced, and interference of the promotion information to the user is reduced.
5) Matching is performed on the promotion information according to a user label to achieve an effect of accurate push and reduce disturbance to the user and improve user experience.
6) Presentation of the promotion information is triggered based on the operation scene, so that a quantity of promotion information positions in an information stream that may be used for push is increased, and utilization of the promotion information position is improved.

Figure 14:
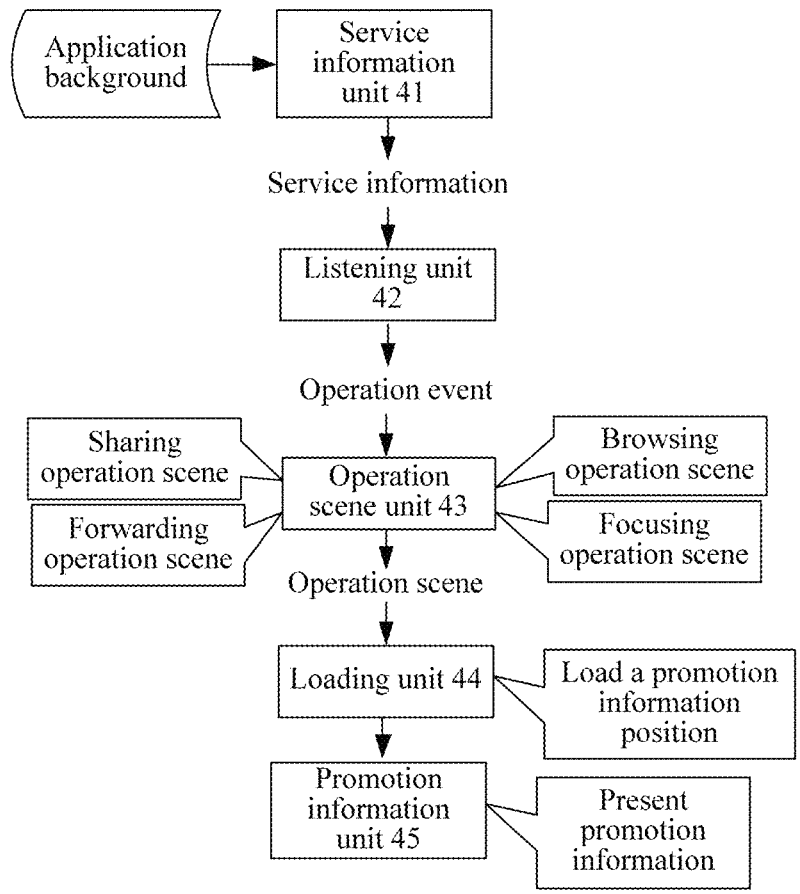
FIG. 14 is another schematic structural diagram of an information processing apparatus according to an example embodiment.

A logical function structure of the foregoing information processing apparatus is described. Referring to a schematic structural diagram of an information processing apparatus shown in FIG. 14, the apparatus includes:

a service information unit 41, configured to present service information in a graphical interface of an application client;
a listening unit 42, configured to listen to an operation event for the service information;
an operation scene unit 43, configured to determine, based on the operation event obtained by listening, that an operation performed by a user on the service information satisfies a predetermined operation scene;
a loading unit 44, configured to load a promotion information position in the graphical interface; and
a promotion information unit 45, configured to present, based on the operation scene, at the promotion information position, promotion information associated with the service information.

In an example embodiment, the promotion information unit 45 is further configured to, present, in a browsing operation scene in which the user updates service information by using a slide operation, at a promotion information position, promotion information associated with content adjacent to a touch point of the slide operation performed by the user and/or context of the adjacent content.

In an example embodiment, the promotion information unit 45 is further configured to present, in a focusing operation scene in which the user focuses service information by using a touch operation, at a promotion information position, promotion information associated with content marked by the user and/or context of the marked content.

In an example embodiment, the promotion information unit 45 is further configured to present, in a forwarding operation scene in which the user forwards service information, at a promotion information position, promotion information associated with content forwarded by the user and/or context of the forwarded content is presented.

In an example embodiment, the loading unit 44 is further configured to load, at a position in the graphical interface at which a touch event for the service information is correspondingly received, the promotion information position in a manner of inserting the promotion information position to the service information.

In an example embodiment, the loading unit 44 is further configured to load, at a position in the graphical interface at which a touch event for service information is correspondingly received, a promotion information position in a manner of covering at least some service information.

In an example embodiment, the loading unit 44 is further configured to: in a browsing operation scene in which the user updates service information by using a slide operation, load, based on an amplitude of the slide operation performed by the user, the promotion information position by sliding in at a first end of the graphical interface, and revoke, by sliding out at a second end of the graphical interface, presentation of some service information.

In an example embodiment, the loading unit 44 is further configured to: revoke loading of the promotion information position in the graphical interface, and resume presentation of the service information in an area originally occupied by the promotion information position.

In an example embodiment, the loading unit 44 is further configured to: in response to a direction and an amplitude of a slide operation performed by the user on the promotion information, gradually reduce the promotion information position in the graphical interface.

In an example embodiment, the loading unit 44 is further configured to: before revoking loading of the promotion information position in the graphical interface, detect that the loaded promotion information satisfies at least one of corresponding revoking conditions:

detecting that duration for which the promotion information is presented at the promotion information position reaches predetermined duration;
detecting that a focusing operation event for the promotion information is not obtained by listening within a predetermined waiting time; and
obtaining by listening for a close event for the promotion information position.

In an example embodiment, the service information unit 41 is further configured to: before the promotion information is presented at the promotion information position, obtain promotion information matching a user label of a user; and preload promotion information.

It should be noted that, the shown function structure may be implemented as a discrete or distributed component, or a function entity combined with another component, using any suitable combination, and located at any suitable position. One or more example embodiments described herein may be executed by hardware, firmware, and/or software. For example, from the perspective of hardware implementation, various units in the information processing apparatus shown in FIG. 14 may be implemented by hardware resources on a terminal side shown in FIG. 3, such as a processor and a network interface.

In conclusion, the example embodiments may achieve the following beneficial effects:
1) Promotion information related to service information is loaded, based on an operation scene, at a promotion information position, so that the promotion information is loaded in a targeted manner in a suitable operation scene, and loading of the promotion information position and processing on presentation of the promotion information may be "seamlessly" connected to a current operation scene of a user, thereby preventing a problem in a related technology that promotion information is presented to a user in a "brute" form such as a pop-up window that causes interference.

2) Information loaded at the promotion information position is associated with service information, to achieve an effect of "immersing" in the operation scene by using presentation of the promotion information as a part of the operation scene, and the promotion information may meet, to the greatest extent, a current requirement for obtaining information by the user, to reduce interference to obtaining the service information by the user.

3) When it is not detected that the user focuses on the promotion information, a close event is obtained by listening, or a presentation time of the promotion information exceeds predetermined duration, the promotion information is no longer presented, to prevent interference caused to obtaining the service information by the user.

4) The promotion information position is loaded in a manner of inserting the promotion information position to the service information, and the promotion information is presented at the promotion information position, so that immersive integration of the promotion information in a graphical interface is implemented, that is, the promotion information is embodied in a content form; and compared with an advertisement form such as a pop-up window, resistance of the user to the promotion information is reduced, and interference of the promotion information to the user is reduced.

5) Matching is performed on the promotion information according to a user label, to achieve an effect of accurate push, and reduce disturbance to the user and improve user experience.

6) Presentation of the promotion information is triggered based on the operation scene, so that a quantity of promotion information positions in an information stream that may be used for push is increased, and utilization of the promotion information position is improved.

Figure 15:
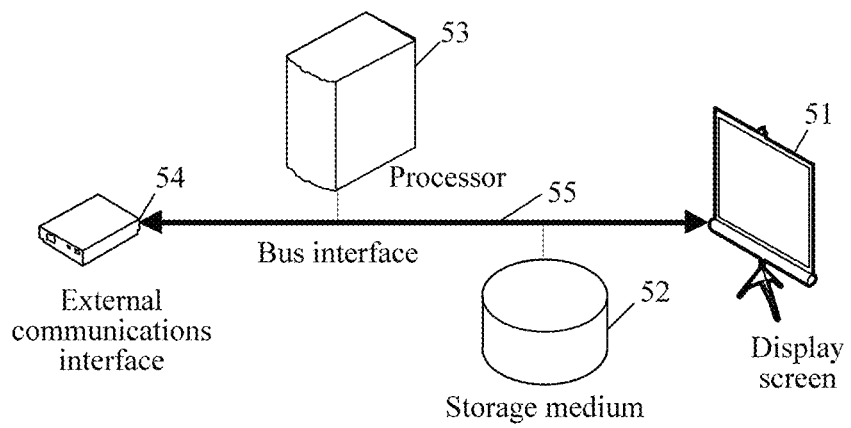
FIG. 15 is another schematic structural diagram of an information processing apparatus according to an example embodiment.

As shown in FIG. 15, an example embodiment provides a display terminal, including:

a display screen 51, configured to display information;
a storage medium 52, configured to store the information; and
a processor 53, separately connected to the display screen 51 and the storage medium 52, and configured to execute computer executable code stored in the storage medium to implement the information processing method provided in the foregoing one or more technical solutions.

The storage medium 52 may include various storage media and may be configured to store a computer program. The storage media included in the storage medium 52 may include a non-transitory storage medium, and the non-transitory storage medium may be configured to store the computer program.

The processor 53 may be connected to the display screen 51 and the storage medium 52 by using a bus interface 55, for example, an integrated circuit (IC) bus interface. The processor 53 may include a processor or a processing circuit such as a CPU, an MCU, a DSP, an AP, or a programmable array, and may be configured to execute the computer program to implement any one of the foregoing information processing methods.

In some example embodiments, the display terminal further includes an external communications interface 54. The external communications interface 54 may include a wireless local area network (WiFi) interface, an optical cable interface, an electric cable interface, a mobile antenna, or the like. The external communications interface 54 may be configured to communicate with another electronic device.

An example embodiment further provides a computer storage medium, the computer storage medium storing computer executable instructions, and the computer executable instructions being configured to perform the information processing method provided in the foregoing one or more technical solutions.

The computer storage medium may be storage media of various types, for example, various media that may store program code, such as a mobile storage apparatus, a random access memory (RAM), a read-only memory (ROM), a magnetic disk, or an optical disk.

In some example embodiments, the computer storage medium may be a non-transitory storage medium.

A person of ordinary skill in the art may understand that all or some of the steps of the method example embodiments may be implemented by a program instructing relevant hardware. The program may be stored in a computer-readable storage medium. When the program runs, the steps of the method example embodiments are performed. The foregoing storage medium includes: any medium that may store program code, such as a mobile storage apparatus, a RAM, a ROM, a magnetic disk, or an optical disc.

In some example embodiments, when the integrated unit in the present disclosure is implemented in the form of a software function module and sold or used as an independent product, the integrated unit may be stored in a computer-readable storage medium. Based on such an understanding, the technical solutions of the example embodiments essentially, or the part contributing to the related technology may be implemented in the form of a software product. The computer software product is stored in a storage medium and includes several instructions for instructing a computer apparatus (which may be a personal computer, a server, or a network apparatus) to perform all or a part of the methods described in the example embodiments. The foregoing storage medium includes: any medium that may store program code, such as a mobile storage apparatus, a RAM, a ROM, a magnetic disk, or an optical disc.

The foregoing descriptions are merely some example embodiments of the present disclosure, but the protection scope of the present disclosure is not limited thereto; and any modification made according to the principle of the present disclosure should be understood as falling within the protection scope of the present disclosure.

In the example embodiments, before promotion information is displayed, service information is first displayed; then, based on an operation event of a user for the service information, an operation scene corresponding to the operation event is determined; and the promotion information is presented based on a presentation parameter matching the operation scene, instead of forcedly presenting the promotion information by using a simple pop-up window as in the existing technology, thereby reducing dislike from the user and reducing information interference sensed by the user. Because of the matching operation scene, a promotion effect of the promotion information may be improved, and therefore, a positive effect is produced in the industry. In addition, computer executable code such as a computer program may be executed to implement the foregoing solution, so that there is a feature of strong industrial realizability.

What is claimed is:
1. A method comprising:
preloading, by at least one processor of a terminal, promotion information in a cache of the terminal;

displaying, on a display of the terminal by the at least one processor, an information stream of service information in a graphical interface of an application client running on the terminal;

monitoring, by the at least one processor, the terminal to detect an operation event of a user that is an operation with the displayed information stream of the service information;

predicting, by the at least one processor, an operation scene of the user by inputting the operation event into a trained model that has been previously trained using a machine learning method based on a plurality of previous operation events of the user and a mapping relationship between the previous operation events and operation scenes, and receiving as an output from the trained model the operation scene of the user from among a plurality of operation scenes, wherein the operation scene is one or more of: a browsing operation scene, focusing operation scene, sharing operation scene, forwarding operation scene, or commenting operation scene;

predicting, by the at least one processor, a presentation parameter corresponding to the operation scene using the trained model, wherein the presentation parameter includes at least one of: a display duration, a display color feature, a promotion information position, a promotion manner, or a subject content of promotion information;

inserting, on the display of the terminal by the at least one processor, the promotion information from the cache into the information stream of the service information that is displayed in the graphical interface of the application client running on the terminal using the presentation parameter so that the promotion information is integrated with the information stream of the service information and does not interfere with the service information being displayed;

monitoring, by the at least one processor, the terminal to detect switching from the operation scene to a subsequent operation scene, wherein when the operation scene is the browsing operation scene and the subsequent operation scene is a focusing operation scene, detecting switching includes determining that the operation event includes selection of a content item from the information stream;

determining, by the at least one processor, based on the subsequent operation scene and the presentation parameter, a second position that is different than a first position; and changing, by the at least one processor, the first position of the promotion information within the information stream to the second position.

2. The method according to claim 1, wherein the inserting the promotion information comprises:
determining, based on the operation scene, at least one of the first position, an attribute, or a display manner; and
at least one of:
inserting the first position in the graphical interface, and displaying the promotion information at the first position;
inserting, in the graphical interface, the promotion information with a matching attribute to the determined attribute;
inserting the promotion information in the graphical interface using the display manner; and
inserting the promotion information at the first position in the information stream.

3. The method according to claim 2, wherein
the first position is inserted in the graphical interface, and the promotion information is displayed at the first position; and
the displaying the promotion information at the first position comprises:
inserting, in the information stream of the service information between service information positions, the first position matching the operation scene, and
displaying the promotion information at the first position.

4. The method according to claim 2, wherein
the promotion information is inserted with the matching attribute; and
the inserting the promotion information with the matching attribute comprises:
inserting, based on the operation scene, at the first position, the promotion information associated with the service information.

5. The method according to claim 2, wherein
the first position is inserted in the graphical interface, and the promotion information is displayed at the first position; and
the inserting the first position in the graphical interface comprises:
in response to a slide operation performed by the user on the information stream of the service information displayed on the graphical interface of the terminal,
inserting, based on an amplitude of the slide operation, the first position by sliding in at a first end of the graphical interface, and
revoking, by sliding out at a second end of the graphical interface, the insertion and display of the service information or a service information position of the service information.

6. The method according to claim 2, wherein
the first position is inserted in the graphical interface, and the promotion information is displayed at the first position.

7. The method according to claim 2, wherein
the operation scene comprises at least one of the following:
a browsing operation scene in which the information stream of the service information is updated by the user using a slide operation on the terminal;
a focusing operation scene in which the information stream of the service information is focused on by the user using a touch operation on the terminal; or
a forwarding and comment operation scene in which the service information is forwarded by the user via the terminal, and a comment is made on the service information by the user via the terminal.

8. The method according to claim 2, wherein the promotion information is displayed at the first position on the graphical interface, and
the method further comprises, before the displaying the promotion information at the first position, obtaining promotion information matching a user label of the user, and preloading the promotion information.

9. The method according to claim 1, wherein the method further comprises:
detecting, with the at least one processor, that the promotion information that is displayed satisfies a corresponding revoking condition; and
revoking, with the at least one processor, an insertion of the promotion information.

10. The method according to claim 9, wherein the detecting that the promotion information that is displayed satisfies the corresponding revoking condition comprises at least one of:
- detecting that a duration for which the promotion information is displayed at the first position reaches a threshold duration;
- detecting that a focusing operation event for the promotion information is not obtained within a threshold waiting time; and
- detecting a close event for the first position.

11. The method according to claim 9, wherein the revoking comprises:
- in response to a slide operation performed by the user on the promotion information displayed on the terminal, revoking, by sliding out at a second end of the graphical interface, the insertion.

12. An apparatus comprising:
- at least one memory configured to store computer program code; and
- at least one processor configured to access the at least one memory and operate according to the computer program code, the computer program code including:
  - preloading code configured to cause at least one of the at least one processor to preload promotion information in a cache of the apparatus;
  - service information code configured to cause at least one of the at least one processor to display, on a display of the apparatus, an information stream of service information in a graphical interface of an application client running on the apparatus;
  - first monitoring code configured to cause at least one of the at least one processor to monitor the apparatus to detect an operation event of a user that is an operation with the displayed information stream of the service information;
  - operation scene code configured to cause at least one of the at least one processor to predict an operation scene of the user by inputting the operation event into a trained model that has been previously trained using a machine learning method based on a plurality of previous operation events of the user and a mapping relationship between the previous operation events and operation scenes, and receiving as an output from the trained model the operation scene of the user from among a plurality of operation scenes, wherein the operation scene is one or more of: a browsing operation scene, focusing operation scene, sharing operation scene, forwarding operation scene, or commenting operation scene;
  - predicting code configured to cause the at least one of the at least one processor to predict, a presentation parameter corresponding to the operation scene using the trained model, wherein the presentation parameter includes at least one of: a display duration, a display color feature, a promotion information position, a promotion manner, or a subject content of promotion information;
  - promotion information code configured to cause at least one of the at least one processor to insert, on the display of the apparatus, the promotion information from the cache into the information stream of the service information that is displayed in the graphical interface of the application client running on the apparatus using the presentation parameter matching the predicted operation scene so that the promotion information is integrated with the information stream of the service information and does not to interfere with the service information being displayed;
  - second monitoring code configured to cause at least one of the at least one processor to monitor the apparatus to detect switching from the operation scene to a subsequent operation scene, wherein when the operation scene is the browsing operation scene and the subsequent operation scene is a focusing operation scene, detecting switching includes determining that the operation event includes selection of a content item from the information stream;
  - determining code configured to cause the at least one of the at least one processor to determine, based on the subsequent operation scene and the presentation parameter, a second position that is different than a first position; and
  - position change code configured to cause at least one of the at least one processor to change the first position of the promotion information within the information stream to the second position.

13. The apparatus according to claim 12, wherein the promotion information code is further configured to cause at least one of the at least one processor to:
- determine, based on the operation scene, at least one of the first position, an attribute, or a display manner; and
- at least one of:
  - inserting the first position in the graphical interface; and displaying the promotion information at the first position;
  - inserting, in the graphical interface, the promotion information with a matching attribute to the determined attribute; and
  - inserting the promotion information in the graphical interface using the display manner.

14. The apparatus according to claim 12, wherein the promotion information code is further configured to cause at least one of the at least one processor to load, in the information stream of the service information between service information positions, the first position matching the operation scene, and to insert the promotion information at the first position.

15. The apparatus according to claim 12, wherein the promotion information code is further configured to cause at least one of the at least one processor to display, based on the operation scene, at the first position, the promotion information associated with the service information.

16. The apparatus according to claim 12, wherein the promotion information code is further configured to cause at least one of the at least one processor to detect that the promotion information that is inserted satisfies a corresponding revoking condition, and revoke insertion.

17. A non-transitory computer storage medium, storing a program which, when executed by at least one processor, performs the operations:
- preloading promotional information in a cache of a terminal;
- displaying, on a display of the terminal, an information stream of service information in a graphical interface of an application client running on the terminal;
- monitoring the terminal to detect an operation event of the user that is an operation with the displayed information stream of the service information;
- predicting an operation scene of the user by inputting the operation event into a trained model that has been previously trained using a machine learning method based on a plurality of previous operation events of the user and a mapping relationship between the previous operation events and operation scenes, and receiving as an output from the trained model the operation scene of the user from among a plurality of operation scenes, wherein the operation scene is one or more of: a browsing operation scene, focusing operation scene, sharing operation scene, forwarding operation scene, or commenting operation scene;

predicting a presentation parameter corresponding to the operation scene using the trained model, wherein the presentation parameter includes at least one of: a display duration, a display color feature, a promotion information position, a promotion manner, or a subject content of promotion information;

inserting, on the display of the terminal, the promotional information from the cache of the terminal into the information stream of the service information that is displayed in the graphical interface of the application client running on the terminal, using the presentation parameter matching the predicted operation scene so that the promotion information is integrated with the information stream of the service information and does not to interfere with the service information being displayed;

monitoring the terminal to detect switching from the operation scene to a subsequent operation scene, wherein when the operation scene is the browsing operation scene and the subsequent operation scene is a focusing operation scene, detecting switching includes determining that the operation event includes selection of a content item from the information stream;

determining, based on the subsequent operation scene and the presentation parameter, a second position that is different than a first position; and changing the first position of the promotional information within the information stream to the second position.

18. The non-transitory computer storage medium according to claim 17, wherein the inserting the promotion information comprises:

determining, based on the operation scene, at least one of the first position, an attribute, or a display manner; and at least one of:
inserting the first position in the graphical interface, and displaying the promotion information at the first position;
inserting, in the graphical interface, the promotion information with a matching attribute to the attribute;
inserting the promotion information in the graphical interface using the display manner; and
inserting the promotion information at the first position in the information stream.

19. The non-transitory computer storage medium according to claim 18, wherein the first position is inserted in the graphical interface, and the promotion information is displayed at the first position; and the displaying the promotion information at the first position comprises:
inserting, in the information stream of the service information between service information positions, the first position matching the operation scene, and displaying the promotion information at the first position.

* * * * *